United States Patent [19]
Farag et al.

[11] Patent Number: 5,206,572
[45] Date of Patent: Apr. 27, 1993

[54] MOTOR CONTROLLER

[75] Inventors: Samir F. Farag, Roswell, Ga.; James T. Cronvich, Harahan, La.

[73] Assignee: Siemens Energy & Automation, Inc., Alpharetta, Ga.

[21] Appl. No.: 462,934

[22] Filed: Jan. 3, 1990

Related U.S. Application Data

[63] Continuation of Ser. No. 209,803, Jun. 22, 1988, abandoned.

[51] Int. Cl.$^5$ ............................................. H02P 1/26
[52] U.S. Cl. .................................................. 318/778
[58] Field of Search .................. 318/778, 779; 361/23, 361/24, 31

[56] References Cited

U.S. PATENT DOCUMENTS

| | | |
|---|---|---|
| 3,809,960 | 5/1974 | Jossic . |
| 3,845,354 | 10/1974 | Boothman et al. . |
| 3,890,494 | 6/1975 | Meshek et al. . |
| 4,099,107 | 7/1978 | Eder ............................ 318/227 |
| 4,286,303 | 8/1981 | Genheimer et al. .................. 361/24 |
| 4,319,298 | 3/1982 | Davis et al. ............................ 361/24 |
| 4,351,012 | 9/1982 | Elms et al. ............................ 361/96 |
| 4,423,458 | 12/1983 | Stich ..................................... 361/93 |
| 4,423,459 | 12/1983 | Stich et al. ............................. 361/94 |
| 4,434,390 | 2/1984 | Elms ..................................... 361/24 |
| 4,446,498 | 5/1984 | Stich ..................................... 361/87 |
| 4,453,117 | 6/1984 | Elms et al. .......................... 318/778 |
| 4,456,867 | 6/1984 | Mallick, Jr. et al. . |
| 4,456,871 | 6/1984 | Stich ..................................... 323/217 |
| 4,467,260 | 8/1984 | Mallick, Jr. et al. . |
| 4,470,092 | 9/1984 | Lombardi ............................... 361/23 |
| 4,535,409 | 8/1985 | Jindrick et al. . |
| 4,539,618 | 9/1985 | Stich ..................................... 361/94 |
| 4,544,982 | 10/1985 | Boothman et al. . |
| 4,547,826 | 10/1985 | Premerlani . |
| 4,578,758 | 3/1986 | Muller ................................. 364/483 |
| 4,581,569 | 4/1986 | Fujioka et al. ...................... 318/811 |
| 4,608,619 | 8/1986 | Bomer et al. . |
| 4,647,825 | 3/1987 | Proflo et al. . |
| 4,743,818 | 5/1988 | Quayle et al. . |
| 4,757,242 | 7/1988 | Prather ................................. 361/24 |
| 4,891,743 | 1/1990 | May et al. ............................. 364/483 |
| 4,996,646 | 2/1991 | Farrington .......................... 364/483 |

FOREIGN PATENT DOCUMENTS

| | | |
|---|---|---|
| 0057970 | 8/1982 | European Pat. Off. . |
| 2044486 | 10/1980 | United Kingdom . |
| 2066597 | 7/1981 | United Kingdom . |
| 2073973 | 10/1981 | United Kingdom . |

OTHER PUBLICATIONS

GEMSTART Integrated Motor Control Centre; General Electric Company; 1986; 8 pages.
IQ-2000 TM Document; Westinghouse; 32 pages.
IQ-1000 Document; Westinghouse; Feb., 1987; 62 pages.
Multilin Inc.; 139 Series Motor Protection Relays; 8 pages.
Multilin Inc.; 169 Motor Management Relay; 1985; 94 pages.
Macrotek; Motor Protection Plus; 19 pages.
Kraus & Naimer Microelectronics; IPS 1100; 12 pages.
Startco Engineering Ltd.; MPU-16A; Jul., 1988; 6 pages.
European Standard Search Report; File No. RS 82433 DE; Dated Feb. 13, 1989.

Primary Examiner—William M. Shoop, Jr.

[57] ABSTRACT

A microcomputer-based device that performs the functions of motor starting and overload protection. The starter function is customized for a particular application by storing program steps representing the input command and output control logic peculiar to a given motor in a programmable, non-volatile memory cell. Each set of program steps, which the microcomputer executes, compose an expandable library of such sets representing the different motor circuit applications available for configuring a starter to match its particular application. A configuration can be changed by simply loading into memory the appropriate set of program steps from the library and changing the labels of the inputs and outputs to match the new application.

9 Claims, 29 Drawing Sheets

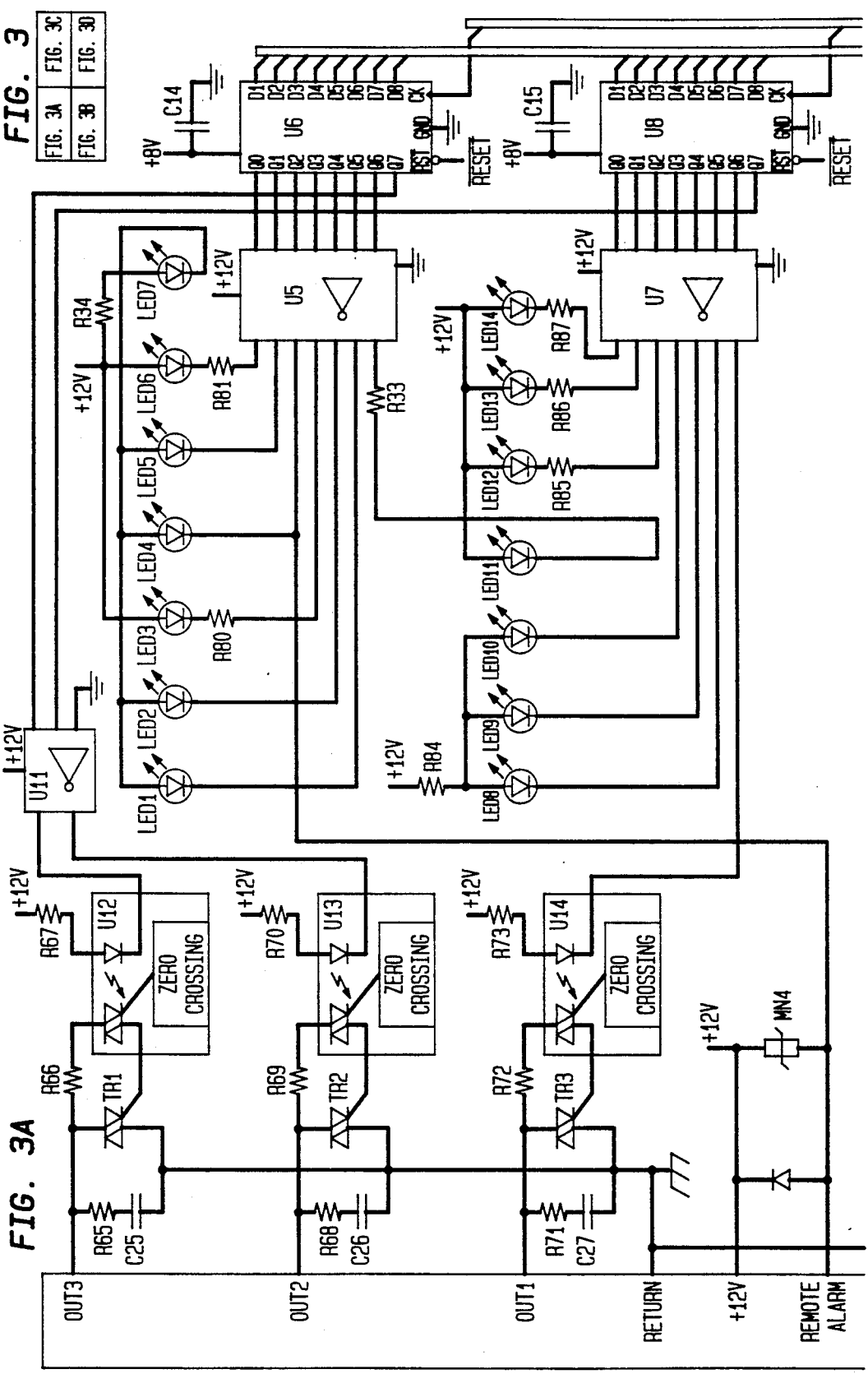

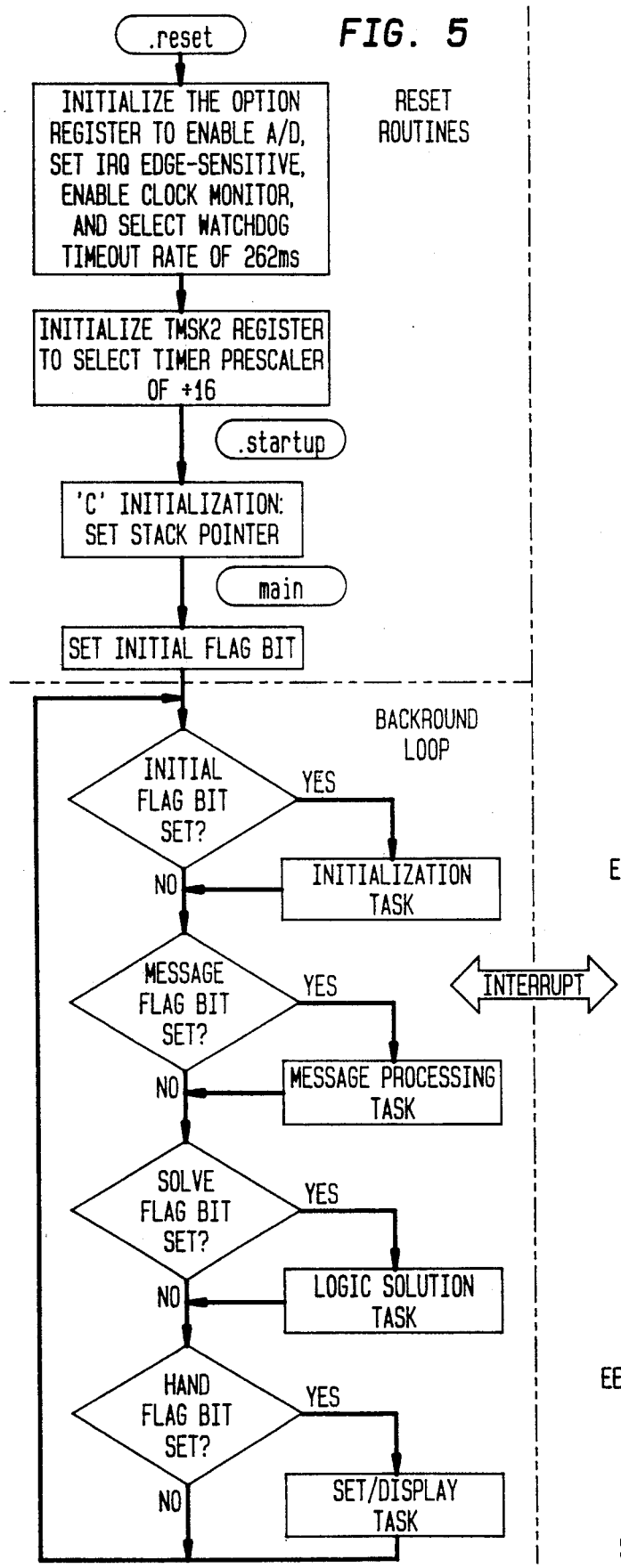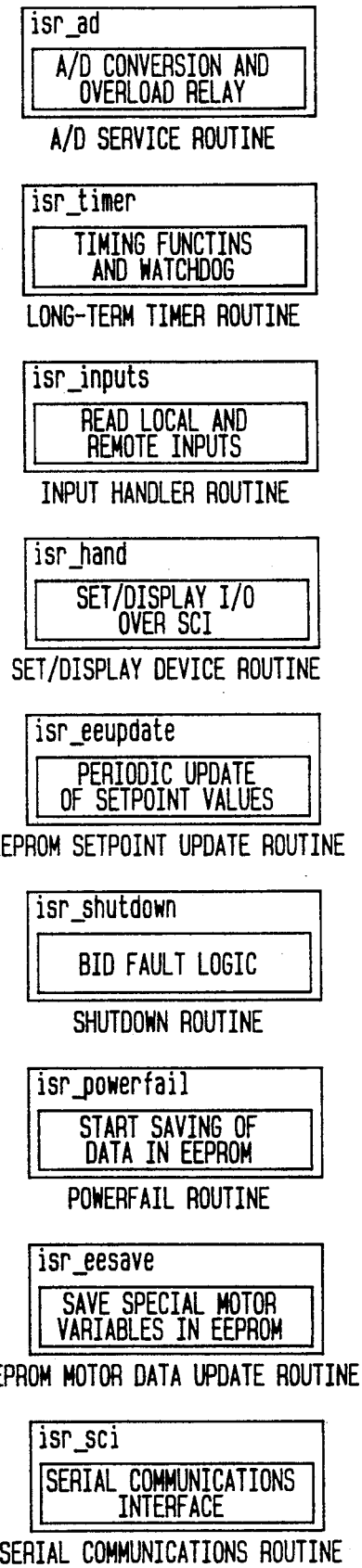
FIG. 5

INITIALIZATION TASK

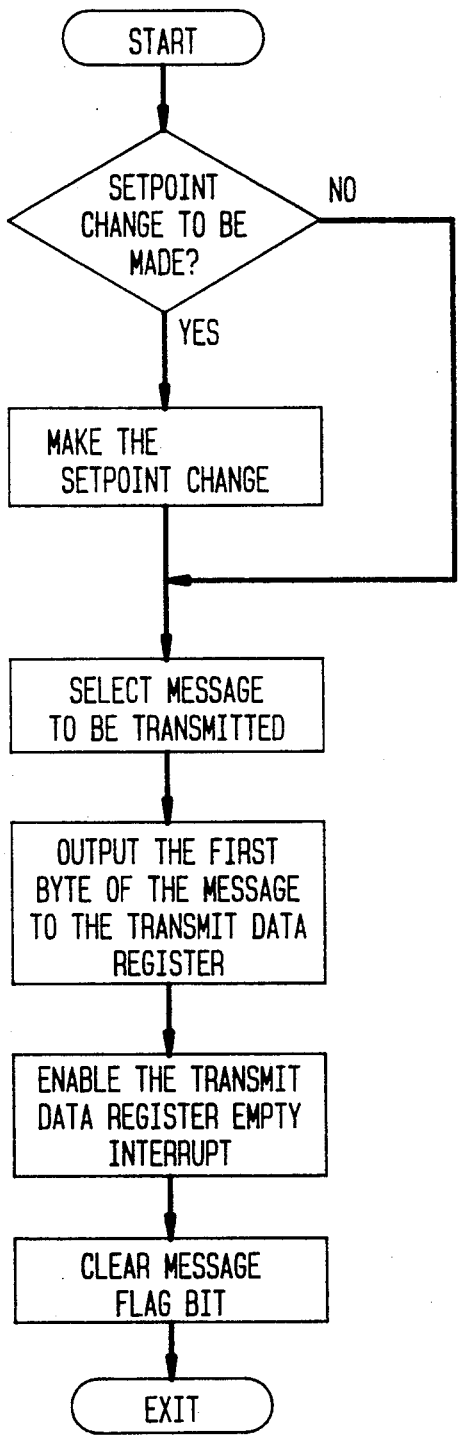

LOGIC SOLUTION TASK

SET/DISPLAY TASK

A/D CONVERSION AND OVERLOAD RELAY ROUTINE BID BY TOC1 INTERRUPT

INPUT HANDLER ROUTINE BID BY TOC2 INTERRUPT

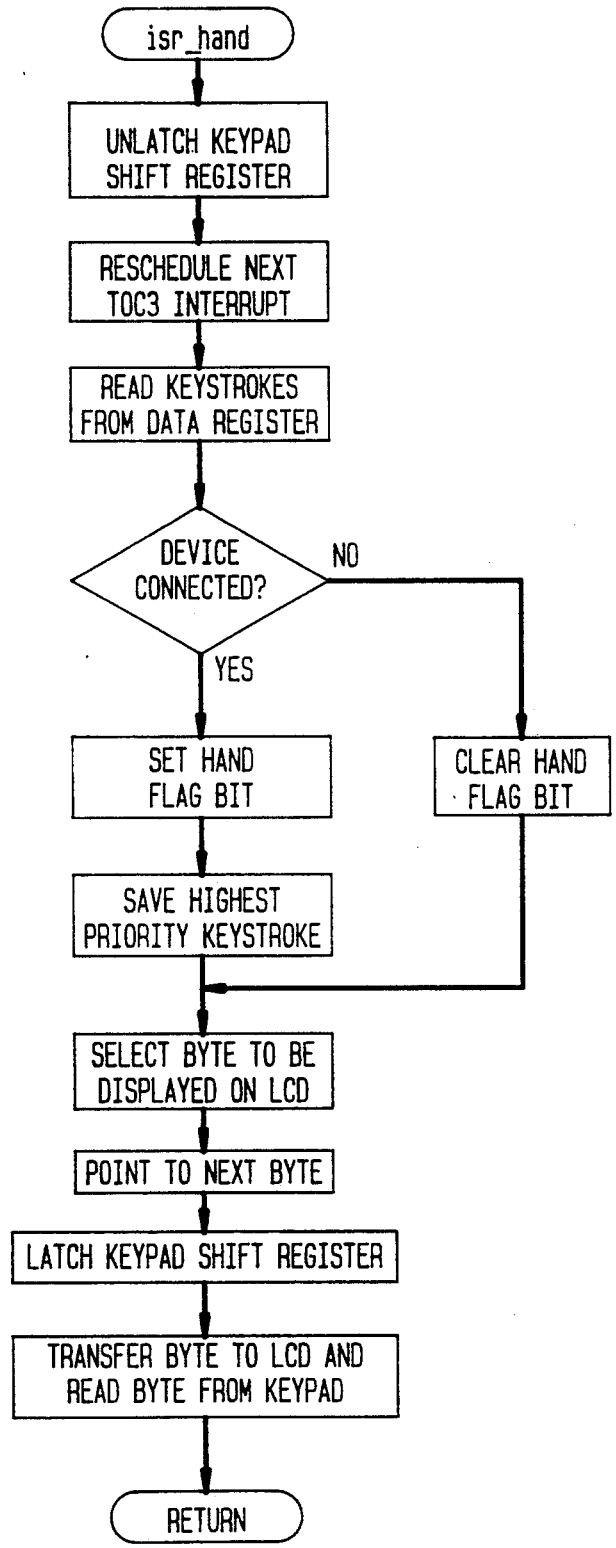

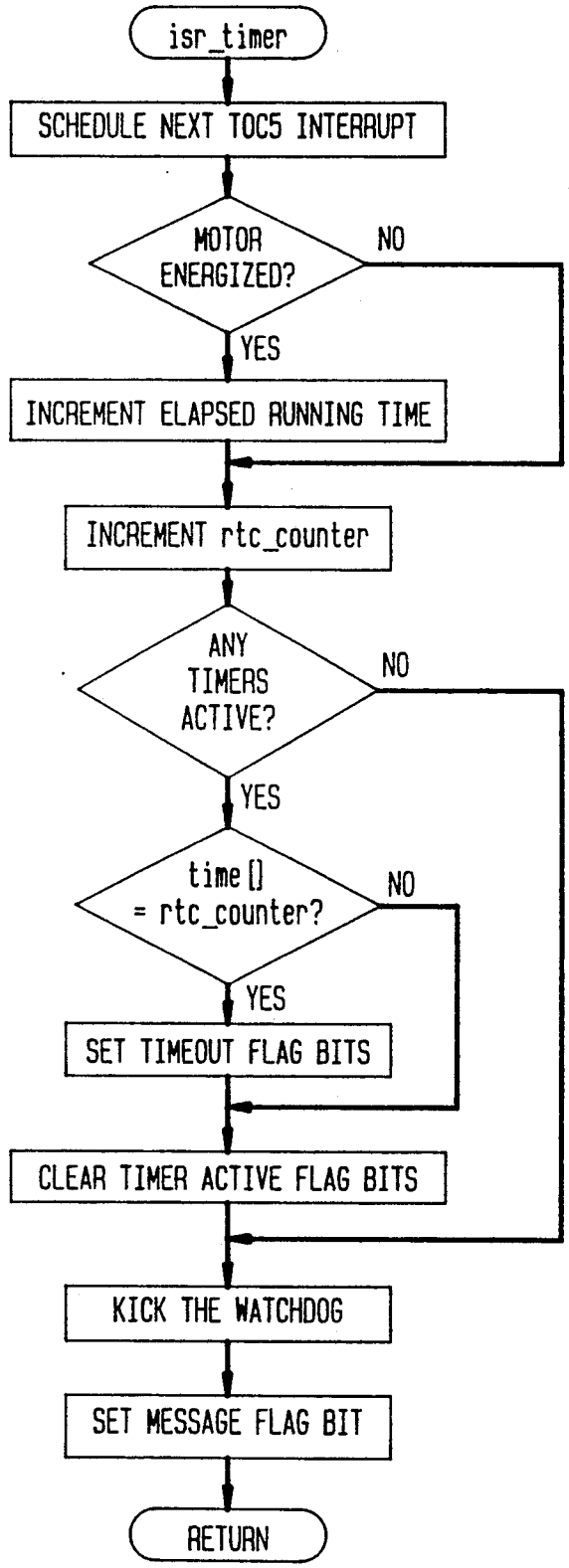

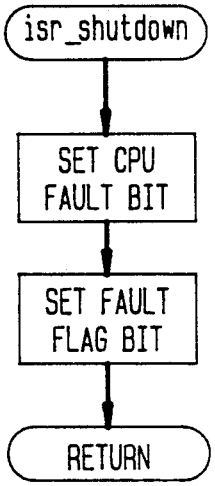
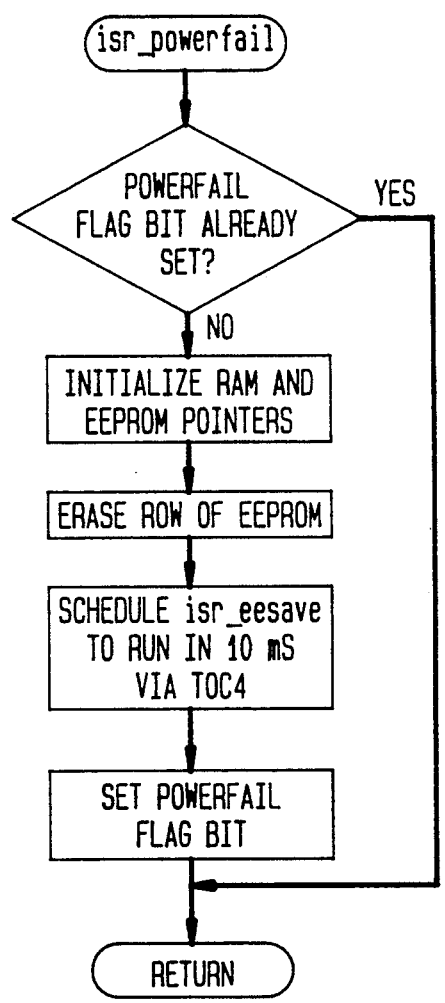

MOTOR DATA SAVE ROUTINE BID BY TOC4 INTERRUPT

UPDATE SETPOINTS ROUTINE BID BY REALTIME INTERRUPT

SERIAL COMMUNICATIONS ROUTINE
BID BY TRANSMITTER OR RECEIVER INTERRUPTS

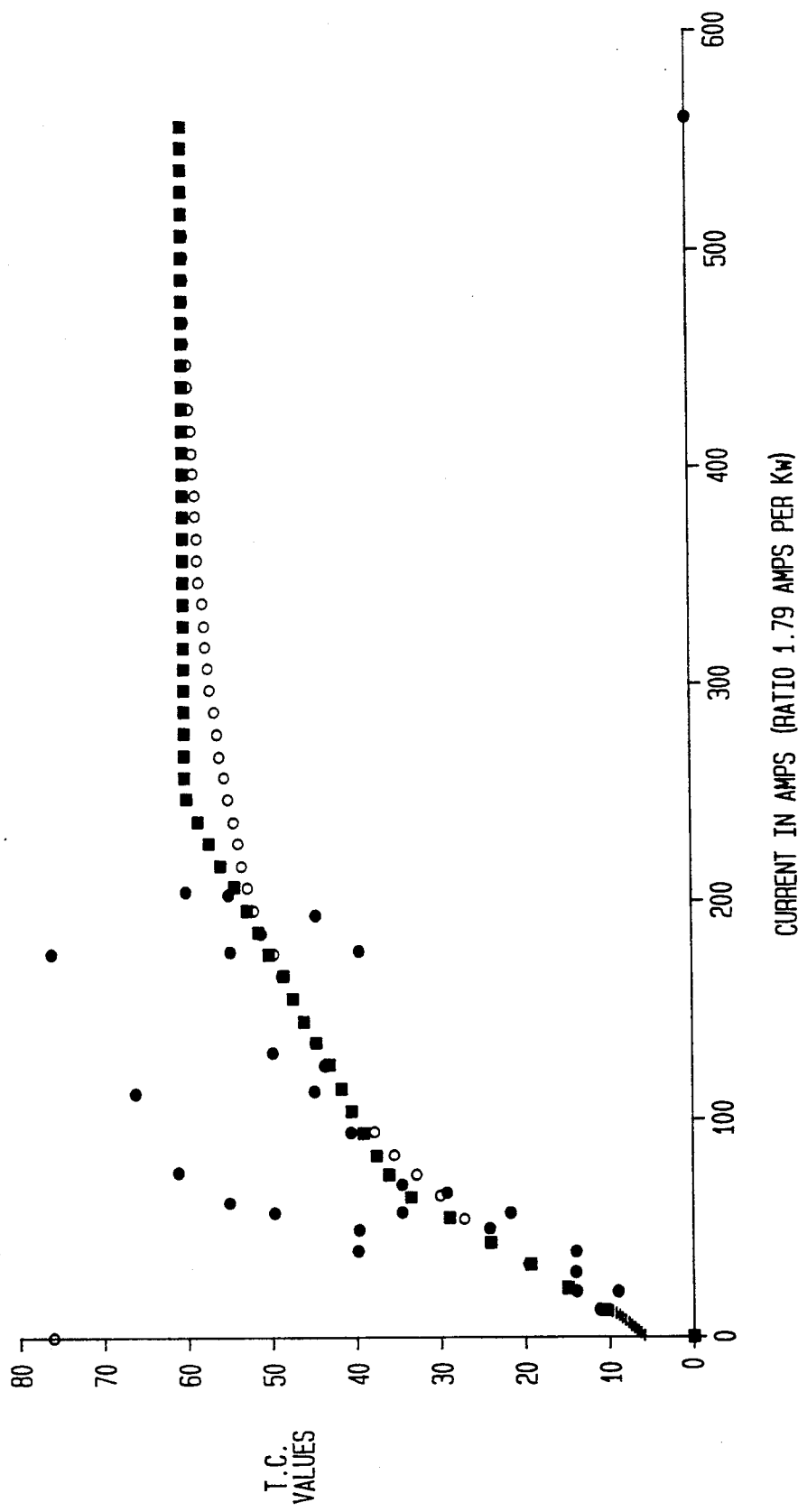

MOTOR CONTROLLER

This is a continuation of application Ser. No. 209,803, filed Jun. 22, 1988, now abandoned.

BACKGROUND OF THE INVENTION

The invention relates to the protection and control of electric motors and, more particularly, to multi function programmable device which provides motor starting regulation, an input-output interface with a motor, motor overload protection, motor diagnostics and motor statistical data.

A motor starter is a control device which functions to start, accelerate, and stop an electric motor by causing the various windings of the motor to be connected to, or disconnected from, a source of electric power in response to manual or automatic commands. In addition to controlling the connection of power to the motor by means of contactors, the starter typically provides annunciator functions, such as visible status indication in the form of pilot lights. Each output, whether controlling a contactor or a pilot light, as well as each output, whether by contact, pushbutton, or switch, is binary in nature.

Motor starter logic has been implemented with electromechanical relays wired together according to a particular application. Relays, however, are large and relatively expensive. Consequently, logic circuitry using solid-state components began to replace wired-relay logic in some applications. Both of these techniques are still widely used, but are relatively inflexible. In the case of wired-relay logic, different applications may require expensive labor-intensive operations, such as rewiring and repositioning of the relays. In the case of solid-state logic, different applications may require either modification of a circuit or replaced with a different version of logic. In both cases, the lack of flexibility forces the manufacturer of the starter to build and stock different versions of starters for different applications. Each version may differ from another in the quantity, layout, and interconnection of components. Different manufacturing requirements for each version frequently result in problems of quality control. It is inconvenient, difficult, and costly to control the quality of many different versions of a motor starter.

The problem of inflexibility has been approached with the use of programmable devices. Programmable logic controllers (PLCs) are devices, usually containing a digital processor and a program memory, designed to make decisions based on successive single-bit information. The program steps stored in memory replace the combinatorial logic of solid-state and the wired logic of relay-type starters. Each input and output may be programmed to perform a particular control function. As the application changes, the generic inputs and outputs can be reassigned and the sequential steps reprogrammed. One problem with PLCs, as applied to the function of motor starting, is that the cost of a PLC is difficult to justify in simple starter applications requiring only a few inputs and outputs.

In addition to PLCs, relatively low-cost programmable integrated circuits designed for use in simple starter applications are available. One problem with these circuits is that the necessary supporting circuitry elevates the cost to unattractive levels relative to the cost of wired-relay solutions. The same can be said for any application using general-purpose programmable devices, such as microcomputers. If, however, a device could combine the function of motor starting with the function of overload protection such a device would prove useful and cost effective in many applications.

Overload relays are dedicated circuit protection devices designed to interrupt the flow of current in an electric circuit upon the detection of undesirable current levels over a period of time. Such current levels can lead to serious damage to a motor through the excessive heating of the motor windings. Upon detection of an overload condition, the overload relay outputs a trip command to a circuit opening mechanism, such as a contactor, which disconnects the load from its power source. Many applications using motor starters also require motor overload protection. For such applications, an overload relay is typically connected into the motor starter circuit and housed in the same control unit enclosure containing the starter.

The most common overload relays are of the thermal type, which include a heater element through which the load current flows and a bimetallic strip that deforms as it is heated by the heater. If heated sufficiently, the bimetallic strip deforms to such an extent that it forces open a contact, which commands the contactor to open the motor circuit. One problem with thermal overload relays is that a supply of different heating elements must be maintained to adjust the relays for different load conditions. In practice, few, if any, extra heater elements are available when needed. Furthermore, any adjustments made are in discrete steps that depend on the ratings of the available heaters.

Electronic overload relays containing microcomputers, which measure the load current by means of current transformers and calculate the heating therefrom, avoid the adjustment problem of thermal devices, but at a greater cost. Even the low-cost electronic overload relays, however, allow only a few parameters to be adjusted. Furthermore, the tripping characteristics of the electronic devices are designed to emulate the tripping characteristics of a thermal relay, instead of being designed such that the motor is more accurately controlled. To keep the cost of simple electronic overload relays competitive with the cost of thermal devices, inexpensive, low-performance microcomputers have been used. The cost of overload devices using higher-performance microcomputers cannot be justified for simple applications, therefor it would be desirable to combine the overload function with other needed functions.

SUMMARY OF THE INVENTION

It is an object of the invention to provide a motor starter and protection apparatus that controls the connection of power to a motor in response to input commands and calculated overload conditions.

An advantage of the invention is that it provides a motor circuit protection means for detecting undesirable operating conditions, such as, overload, jammed motor, and sudden loss of load, causing the motor circuit to be opened upon the occurrence of any such condition.

Another advantage is to provide an inexpensive means of easily adjusting the parameters of the motor model and, thereby, the overload tripping characteristic, i.e., the tripping time for a given motor temperature and overload current.

Another advantage is to provide a motor starter and protection apparatus based on a programmable microcomputer for cost-effectively performing the functions of starting and protection.

Accordingly, there is provided a motor control unit including a control circuit including a microprocessor, a display panel including an array of eletroptic indicators representative of motor conditions, and means for coupling the control circuit to the indicators such that a program input to the microprocessor defines the conditions represented by the indicators. The motor control unit functions to start a motor and protect the motor from overload conditions.

BRIEF DESCRIPTION OF THE DRAWINGS

FIG. 5 is a flowchart giving an overview of the structure of the operating program for the Motorola model MC68HC11 microcomputer used in the preferred embodiment;

FIG. 6a–6d are flowcharts showing the sequence of program steps in the background tasks of FIG. 5;

FIGS. 7–14 are flowcharts of the interrupt service routines of FIG. 5;

FIGS. 16 and 17 are graphical representation of motor test data;

DESCRIPTION OF A PREFERRED EMBODIMENT

In the preferred embodiment of the motor controller, motor control is based on two parameters, motor current and time. The motor controller function is customized for a particular application by storing program steps representing the input command and output control logic peculiar to the given application in a programmable, non-volatile memory cell. Each set of program steps, which the microcomputer executes, compose an expandable library of program sets representing the different motor circuit applications available for configuring a starter to match its particular application. A configuration can be changed by simply loading into memory the appropriate set of program steps from the library and changing the labels of the inputs and outputs to match the new application. As will be discussed, the program steps used for analysing motor feedback (motor current) are based on a motor model.

Detecting an overload, a motor jam, or a loss of load is realized in the code of the microcomputer and is based on the root-mean-square (rms), or effective, value of the motor, or load, current. The method of measuring the rms value of the load current includes sensing the instantaneous current in at least one phase of a single or multi-phase electric circuit, rating each current to a range suitable for electronic processing, converting each rated value to a digital representation, squaring each digital representation, or sample, and digitally filtering the squares of the samples to produce a digital word representing the dc value of the square of the load current, which word is also the square of the rms value of the load current. Taking the square root of the resulting word yields the rms value of the load current. As will be seen, the method described actually combines and filter and square-root procedures into a single procedure, obviating the need for a separate, time-consuming square-root procedure.

Figure 1:
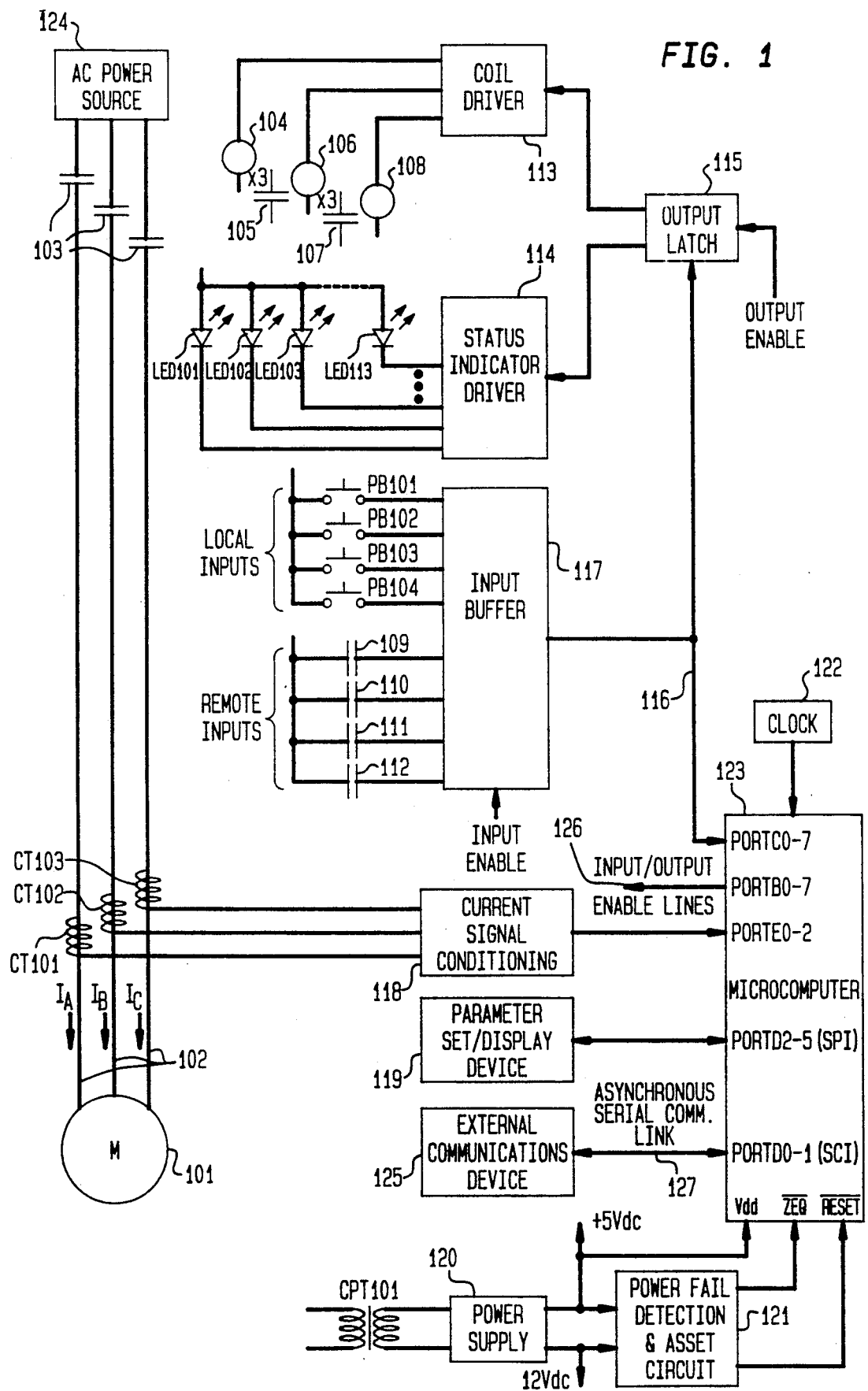
FIG. 1 is a functional block diagram of a preferred embodiment of the invention connected as an across-the-line motor starter.

The functional schematic diagram of FIG. 1 shows an embodiment of the invention connected as an across-the-line motor starter with an electric motor 101 protected and controlled by a circuit opening and closing mechanism, such as a contactor comprising contacts 103 and an actuating coil 104. The actuating coil is energized by a coil driver stage 113. The coil driver stage 113 can also independently control up to two more circuit opening and closing mechanisms, such as a pair of contactors comprising contacts 105 and 107 and actuating coils 106 and 108, respectively. Other motor starting applications, such as reversing, two-speed, and reduced-voltage, require the connection of more than one such mechanism to the motor circuit.

In the across-the-line starting application shown in FIG. 1, current supplied to the actuating coil 104 by the coil driver stage causes the contacts 103 to close, connecting the motor 101, by means of electrical conductors 102, directly to an ac power source 124, which supplies the power necessary to start and run the motor 101. When the coil driver stage interrupts the supply of current to the actuating coil 104, the contacts 103 open, disconnecting the motor 101 from the source of ac power. The decision to energize or de-energize the motor 101 is made by a programmable means, such as a microcomputer 123. The microcomputer 123, as directed by the operating program stored in its memory, controls the application of power to the motor 101 by means of the coil driver stage 113. The microcomputer 123, according to its program, translates input commands and conditions into output actions. Furthermore, by monitoring the current in the motor 101, the microcomputer 123 can protect the motor 101 from damage due to excessive heating.

By way of example, the preferred embodiment of the motor controller uses a Motorola model MC68HC11 microcomputer as the programmable means. Details of the structure and operation of the MC68HC11 can be found in Motorola's published documentation on this microcomputer.

There are three sources of input commands to the motor control and protection system. First, up to seven local commands may be entered by pushbuttons PB101–107. Second, up to four remote commands may be entered by pushbuttons or contacts 109–112. Third, commands may be entered by means of an external communications device 125, typically including computer intelligence, over an asynchronous serial communications link 127.

The seven local pushbutton commands and the four remote contact commands are read by the microcomputer over an eight-bit bidirectional data bus 116, which is an extension of the microcomputer's PORT C. The local and remote input commands are buffered by an input buffer 117, which permits the microcomputer to read input commands or conditions by enabling the buffer with an enabling logic level on the appropriate output line of PORT B 126. By complementing the logic level to disable the input buffer, the microcomputer causes the buffer to isolate the inputs electrically from the PORT C data bus 116, so that output commands can be issued over the bus 116. In practice, the buffer shown functionally in FIG. 1 may comprise a plurality of physical buffers, each requiring its own dedicated enable line from PORT B 126. Both remote and local inputs are binary in nature, with a low logic level indicating an open contact or a relaxed pushbutton and a high logic level indicating a closed contact or a depressed pushbutton. The microcomputer 123 reads the inputs periodically at a rate empirically determined to ensure detection of normal pushbutton depressions. The microcomputer 123 also collects any input commands sent over the asynchronous serial communications link.

A sequence of logic equations that translate input commands and conditions into output actions is stored in the microcomputer's memory. Once the translation is made, the microcomputer's PORT C is configured by the program as an output and the output action is sent out over the bus to an output latch 115. The output action is realized as binary logic levels on the PORT C bus 116. The logic levels are latched into the output latch by a logic level transition sent to the output latch's clock input over one of the PORT B 126 output enable lines. In practice, the output latch shown in FIG. 1 may comprise a plurality of physical latches, each requiring its own dedicated enable line form PORT B 126. The logic levels latched to the output of the output latch control 115 are a coil driver stage 113 and a status indicator driver stage 114. The coil driver stage 113 performs control action by energizing or de-energizing the actuating coils 104, 106, 108. The status indicator driver stage independently controls up to thirteen discrete status indicators, such as light-emitting diodes (LEDs) LED101-114.

The following example is designed to clarify the operation of the embodiment as a motor starting control by illustrating the assignment of input and output functions for a typical application. References are to FIG. 1.

EXAMPLE: LOCAL 3-WIRE, REMOTE 2-WIRE, ACROSS-THE-LINE STARTER.
LOCAL INPUT ASSIGNMENTS (PUSHBUTTONS PB101-107)

PB101 - STOP (stop the motor)
PB102 - START (start the motor)
PB103 - Not used
PB104 - HAND (hand, or local, control)
PB105 - OFF (control disabled)
PB106 - AUTO (automatic, or remote, control)
PB107 - Reserved for a special function
REMOTE INPUT ASSIGNMENTS (REMOTE INPUTS 109-112)

Remote input 109 - closed (start the motor)
    open (stop the motor)
Remote input 110 - Not used
Remote input 111 - Not used
Remote input 112 - Not used
COIL DRIVER OUTPUT ASSIGNMENTS (COILS 104, 106, 108)

Coil 104 - energized (start the motor)
    de-energized (stop the motor)
Coil 106 - Not used
Coil 108 - Not used
LED OUTPUT ASSIGNMENTS (LED101-113)

LED101 - Reserved for a special use
LED102 - Reserved for a special use
LED103 - Reserved for a special use
LED104 - Reserved for a special use

EXAMPLE: LOCAL 3-WIRE, REMOTE 2-WIRE, ACROSS-THE-LINE STARTER.

LED105 - Reserved for a special use
LED106 - Reserved for a special use
LED107 - Reserved for a special use
LED108 - AUTO (control in automatic, or remote, control mode)
LED109 - OFF (control disabled)
LED110 - HAND (control in hand, or local, control mode)
LED111 - Reserved for a special use
LED112 - Not used
LED113 - RUN (motor energized)
LED114 - STOPPED (motor de-energized)

All of the defined inputs and outputs are binary, i.e., either off or on, "0" or "1", false or true, low or high. Consequently, each output is determined by solving a Boolean logic equation whose terms may include both inputs and outputs. For the example, six Boolean equations are required—one for each output assignment. The program code implementing the set of Boolean equations typically differs from one motor starter type to another, just as the function assignments of the inputs and outputs differ from one application to another.

In addition to functioning as a motor starter control unit, the embodiment depicted in FIG. 1 also protects the motor circuit which includes the motor 101, conductors 102, and any in-line devices, such as contacts 103, from damage due to overloading. Alternating load current $I_a$, $I_b$, and $I_c$ in each phase of the three-phase motor circuit shown in FIG. 1 is sensed by current transformers CT101-103. The secondary currents in the current transformers CT 101-103 are processed by a signal conditioning circuit 118, which converts the current signals to proportional voltage signals. The signal conditioning circuit 118 also rectifies the voltage signals, thereby providing at its output rectified ac voltage signals proportional to the magnitudes of the secondary currents in the current transformers and, consequently, to the magnitudes of the load currents $I_a$, $I_b$, and $I_c$. Each of the three rectified voltage signals is applied to an individual PORT E input of the microcomputer. Each input is connected internally to a different channel of the microcomputer's A/D converter. The A/D converter periodically samples and converts each of the three signals at its input channels, producing digital representations of the instantaneous magnitudes of the load current in each phase. Program code in the microcomputer 123 uses the digital representations of the three load currents to determine whether protective action, such as interrupting the flow of power to the motor 101 by opening the contacts 103, is required.

In its function as a motor starter capable of being connected and programmed to handle many applications, the system in FIG. 1 may control, among other parameters, the starting, stopping, direction, and speed of a motor in response to operating conditions or manual or automated, local or remote, commands. By sensing the load current, the microcomputer 123 can determine whether or not a contactor responded correctly to a command to open or close. In its protective function as an overload sensing relay, the system detects overload and unbalanced conditions by measuring the load current. The motor thermal model implemented in the operating program uses the magnitude of the load current and the percentage of current unbalance to compute the housing and winding temperatures of the motor and to trip it off before the temperatures reach damaging levels. Like the main functions of motor starting and overload protection, the further features of motor jam protection and loss of load protection rely on an accurate measurement of load current for correct operation.

Figure 2:
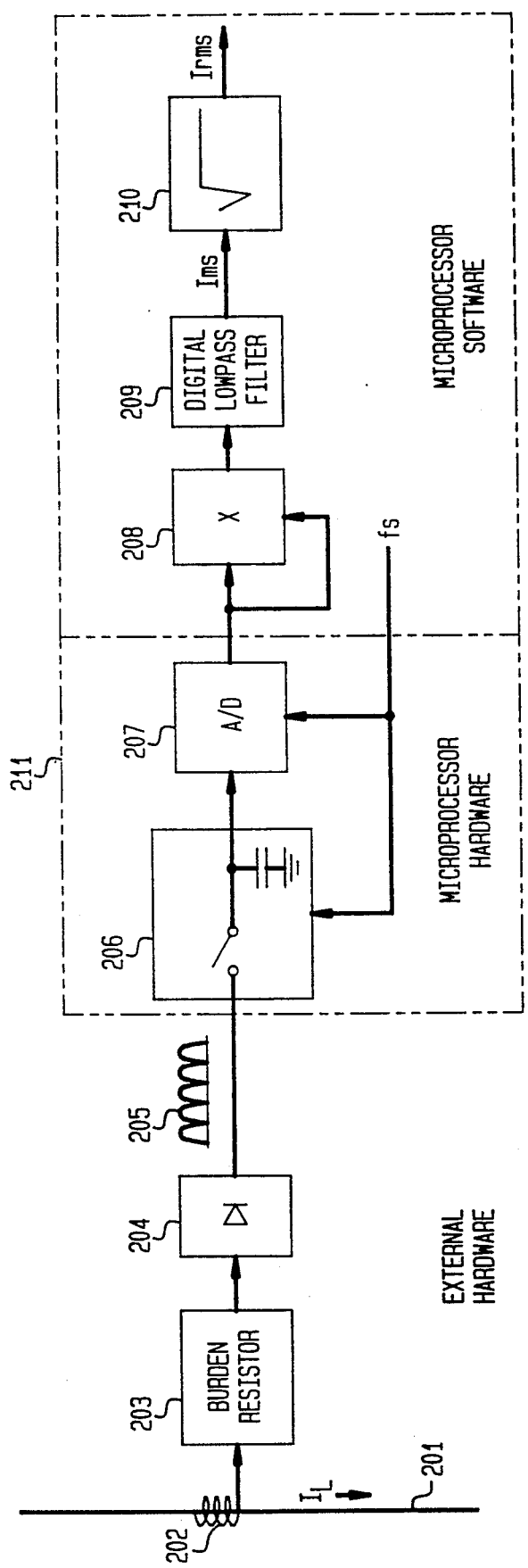
FIG. 2 is a block diagram of a single phase of the current-sensing system.

FIG. 2 is a block diagram of a single phase of three-phase current-sensing system. The other two phases ar handled similarly. Alternating load current in the motor line 201 induces a proportional current in a current transformer 202. The constant of proportionality is determined by the number of turns in the secondary winding of the current transformer 202. The secondary current is applied to a burden resistor 203. The current produces across the burden resistor 203 a voltage proportional to the secondary current and, thus, to the load current. The voltage across the burden resistor 203 is rectified in a full-wave rectifier 204, or an absolute value, circuit, producing an output voltage waveform 205 proportional to the absolute value of the load current.

The rectified voltage from the rectifier 204 is applied to a sample-and-hold means 206 and an A/D converter means 207. In the preferred embodiment, the sample-and-hold and the A/D converter 207 are integrated into a microcomputer 211. The sample-and-hold samples its input waveform at the sampling frequency $f_s$. The analog sample is then digitized by the A/D conversion process into eight bits covering a range from 0V to the reference voltage level. The eight-bit digital output of the A/D conversion ranges from 0 (decimal), or 00000000 (binary), for an 0V input to 255 (decimal), or 11111111 (binary), for an input voltage equal to the reference level. The digital output of the A/D converter 207 is the digital sample value used in the program's computation. The program requests another sample value every $1/f_s$ seconds by sending a start conversion command to the sample-and-hold 206 and A/D converter 207 at a rate of $f_s$.

The digitized sample value out of the A/D converter 207 is squared in a multiplier 208 and applied to a digital lowpass filter 209. The output of the digital lowpass filter 209, $I_{ms}$, is a digital value proportional to the mean-square value of the load current. A square-root means 210 produces the root-mean-square (rms) value, $I_{rms}$, from the mean-square value. It is the rms value of the load current that is used by the program in its current-dependent computations.

Although sampling precedes squaring in the actual current measuring sequence, the analysis can be performed such that squaring precedes sampling. (The two steps commute in theory. In the preferred embodiment, squaring is done in software because the cost of squaring in hardware is greater than in software.)

Under normal conditions, the load current comprises a fundamental frequency component (50 Hz or 60 Hz) and a number of components at odd harmonics of the fundamental. The load current waveform depends on the relative amplitudes and phase relationships of the fundamental and its harmonics. The current waveform is the input to the current-sensing system of FIG. 2. The steps of rectifying and squaring are mathematically equivalent to squaring alone. (Rectification is performed to increase the resolution of the A/D conversion process by reducing the conversion input range by a factor of two.) It is well known that squaring a series, or sum, of sinusoids of various frequencies, such as a fundamental and its harmonics, produces another series of sinusoids whose frequencies are the sums and differences of all the frequencies in the original series. The relative amplitudes and phases of the frequency components in the original series determine the relative amplitudes and phases of the components in the output, squared series. In the case of a series containing a fundamental and odd harmonics, the resulting squared series contains only even harmonics. Furthermore, the dc value (i.e., the 0th harmonic—a degenerate even harmonic) of the resulting squared series is the mean-square value of the original series. The dc value of the square of the load current is the mean-square value of the load current. An objective is to isolate the dc value of the square of the load current by blocking all the higher order even harmonics, passing only the dc component. The digital lowpass filter is designed to achieve that objective.

The sampling frequency is a critical parameter in the design of the lowpass filter. Several criteria may be used in selecting the sampling frequency.

1. To minimize processing time, the sampling frequency should be as low as possible.
2. The sampling frequency should result in a filter whose response time is fast enough to handle the fastest specified trip time.
3. The sampling frequency should result in a filter that adequately attenuates the even harmonics in the square of the load current.
4. The sampling frequency should result in samples at many different relative points on the waveform from cycle to cycle to minimize the effects of A/D quantization levels.
5. The sampling frequency should result in a filter that works well for both 50 Hz and 60 Hz systems.

A single-pole digital lowpass filter is represented by the iterative difference equation $$Y_k = aY_{k-1} + (1-a)X_k,$$

where $X_k$ is the kth sample input to the filter, $Y_k$ is the output of the filter computed using the kth input, $Y_{k-1}$ is the previous output of the filter, and a is a filter coefficient between 0 and 1 related to the bandwidth. In a filter for the square of the load current, $X_k$ is the square of the most recent sample of the current. The careful selection of the sampling frequency and the filter coefficient results in a filter that satisfies the listed criteria, and the computed output $y_k$ represents the mean-square value of the load current, and the square root of $Y_k$ represents the rms value of the load current. The difference equation can be rewritten in terms of the rms value (RMS) and the load current sample (I) as follows:

$$RMS_k^2 = aRMS_{k-1}^2 + (1-a)I_k^2.$$

If the rms value does not change significantly from sample to sample, as is typically the case, (i.e., $RMS_k$ is approximately equal to $RMS_{k-1}$), the previous difference equation can be rewritten, after each term is divided by $RMS_{k-1}$, as follows:

$$RMS_k = aRMS_{k-1} + (1-a)I_k^2/RMS_{k-1}.$$

Thus, the rms value can be computed from the input current sample and the previous rms value without evoking a time-consuming square-root routine. Each time a new sample of the load current is made, a new rms value is computed. In the preferred embodiment, a sampling frequency of 171 Hz and a filter coefficient of $1-2^{-4}$ (0.9375) give the desired results.

As will be shown and discussed later, the microcomputer uses the digital representations of the rms values Table 1 lists function inputs, the description of each function input and the setting range for each function input. Further details on the set/display device 119 and the functions in the table are discussed later.

TABLE 1

| FUNCTION | DESCRIPTION | SETTING RANGE |
| --- | --- | --- |
| F1 | DISPLAY CONTROL CIRCUIT NUMBER | 10-64 |
| F2 | DISPLAY NEMA SIZE | 1A, 1B, 1C, 2, 3, 4, 5, 6 |
| F3 | DISPLAY NEMA SIZE FOR LOW SPEED FOR A 2-SPEED MOTOR | 1A, 1B, 1C, 2, 3, 4, 5, 6 |
| F4 | FULL LOAD CURRENT FOR OVERLOAD RELAY #1 | 0.3-540 amperes |
| F5 | FULL LOAD CURRENT FOR OVERLOAD RELAY #2 | 0.3-540 amperes |
| F6 | SERVICE FACTOR | 1.0 or 1.15 |
| F7 | OVERLOAD TRIP CLASS | 2-23, with/second increments |
| F8 | AUTO RESET | On/Off |
| F9 | PHASE UNBALANCE PROTECTION | On/Off |
| F10 | ALLOW EMERGENCY RESTART | On/Off |
| F11 | TIMER #1 | 0-200, with/second increments |
| F12 | TIMER #2 | 0-200 with/second increments |
| F13 | DISPLAY LOAD CURRENT | .3-540 amperes |
| F14 | DISPLAY LAST TRIP CURRENT | .3-5400 amperes |
| F15 | DISPLAY PERCENTAGE CURRENT UNBALANCE | Percentage |
| F16 | DISPLAY MOTOR ELAPSED TIME | Up to 99990 hours |
| F17 | DISPLAY # OF MOTOR STARTS | Up to 99990 |
| F18 | DISPLAY # OF OVERLOAD TRIPS | Up to 99990 |
| F19 | RESET MOTOR DATA TO ZERO (F17, F18, F19) | Up to 99990 |
| F20 | SET PROCESS CURRENT WARNING | Up to 100 of fully load current |
| F21 | JAM PROTECTION | On/Off |
| F22 | LOSS OF LOAD | Warning/Protection |
| F23 | DISPLAY TIME TO RESET | Up to 9999 seconds |
| F24 | DISPLAY ACCUMULATED THERMAL MEMORY | Up to 250% of the temperature of the winding at full load current | of the load currents in the three phases to evaluate the performance of the motor and to effect protective and control action as required. These digital representations are applied to a motor model for purposes of motor control.

Figure 4:
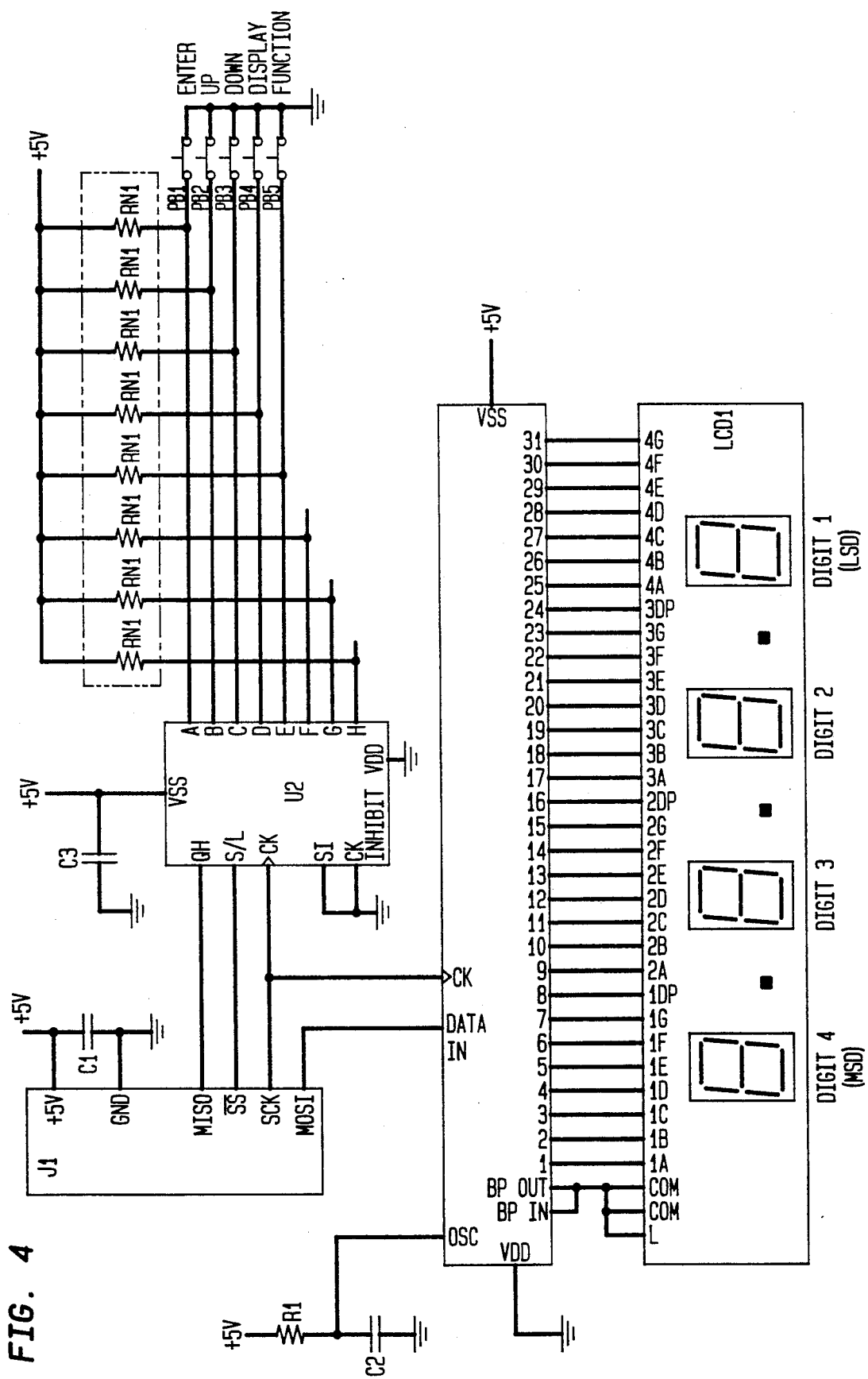
FIG. 4 is a circuit diagram of a preferred embodiment of a set/display device.

Consider again the function diagram of FIG. 1. Various motor and starter parameters may be entered manually and various status data displayed by means of a parameter set/display device 119. This device 119 can take the form of a hand held unit. In the preferred embodiment, the set/display device 119 is a passive device external to the physical package containing the microcomputer 123. Because the set/display device 119 includes no power source and no inherent intelligence, it must be connected to the microcomputer unit to operate. The microcomputer unit serves as a master controller of the slave set/display device 119. Because the set/display device 119 is portable, it may be used with any master controller. Thus, in an application requiring a number of motor control and protection systems, only one set/display device 119 is needed, resulting in a cost savings. Furthermore, such a device is a convenient means of permitting a user to change motor protection parameters and to monitor certain operating conditions. As illustrated in FIG. 4, the set/display device 119 includes a four-character liquid crystal display (LCD) 401 and a five-button keypad PB1-PB5 in a small handheld enclosure (not shown). The set/display device 119 is controlled by the microcomputer over its serial peripheral interface, a synchronous data transfer means using PORT D pins 2-5.

As mentioned previously, an external communications device 125 connected via a serial communications link 127 to the microcomputer's serial communications interface (SCI) can send control commands to the motor control and protection system. Besides sending commands, the external communications device 125, like the set/display device 119, may set motor control and protection parameters. Furthermore, the external communications device 125 may read various operating conditions transmitted by the microcomputer over the communications link 127. In addition to the display quantities and the settings of Table 1, the status of the indicator LEDs is transmitted by the microcomputer 123 over the communications link 127. Of course, the external device 125 must be programmed to communicate using the communications protocol programmed in the microcomputer 123 and to translate the received data from the transmitted format into a format meaningful to the user of the data.

Another important function of the external communications device 125 is sending the code representing the Boolean motor starter equations to the microcomputer 123. A major reason the MC68HC11 was chosen as the core of the preferred embodiment is its 512 bytes of on-board EEPROM. Memory of the EEPROM type has the special characteristics of non-volatility (i.e., the contents of EEPROM do not change when power is removed, eliminating the need for expensive batter backup schemes) and electrical erasability and programmability (i.e., contents of EEPROM can be altered in-circuit, without using external erasing devices, such as ultraviolet lamps). Further advantages of the particular EEPROM cell in the MC68HC11 are that program code can be executed out of the cell and that the cell's size (512 bytes) can hold the required amount of code. EEPROM is, therefore, an excellent medium for the storage of specialized data and custom program segments that differ from one application to another.

Program code and constants common to all applications are stored permanently in the masked ROM portion of the microcomputer's memory. Program code implementing the set of Boolean equations developed for a given motor starter type is stored in the microcomputer's EEPROM. It is the EEPROM that gives the preferred embodiment its versatility. A single hardware configuration can operate as any one of many motor starter types. The serial communications link 127 is the means over which the program code implementing the Boolean equations peculiar to the application are transferred to the EEPROM i.e. down loading program code to EEPROM. The step of transferring the code, while usually performed by the manufacturer of the motor control and protection system at his own factory, may also be performed by a user outfitted with an external communications device 125 programmed for the task.

Certain variables frequently updated by the operating program must be saved in the event of a loss of power to the microcomputer 123. Examples of such variables are the elapsed running time on motor, the number of motor starts, and the number of overload trips. A powerfail detection and reset circuit 121 anticipates a power failure, notifying the microcomputer by driving its IRQ pin to a logic low level. The low-going transition at IRQ generates a microcomputer interrupt that vectors program execution to a routine that begins saving the variables in EEPROM. If the power failure persists, the circuit eventually applies a logic low level at the RESET pin of the microcomputer 123, causing it to reset.

A power supply circuit 120 converts ac power from a control power transformer CPT101 into a regulated 5 Vdc source of power for the microcomputer and other logic circuit elements and an unregulated 12 Vdc source of power for certain circuit elements, such as LEDs and operational amplifiers. The powerfail detection circuit monitors the 12 Vdc potential and notifies the microcomputer 123 of an imminent power failure whenever the voltage drops below a specified level.

Figure 3B:
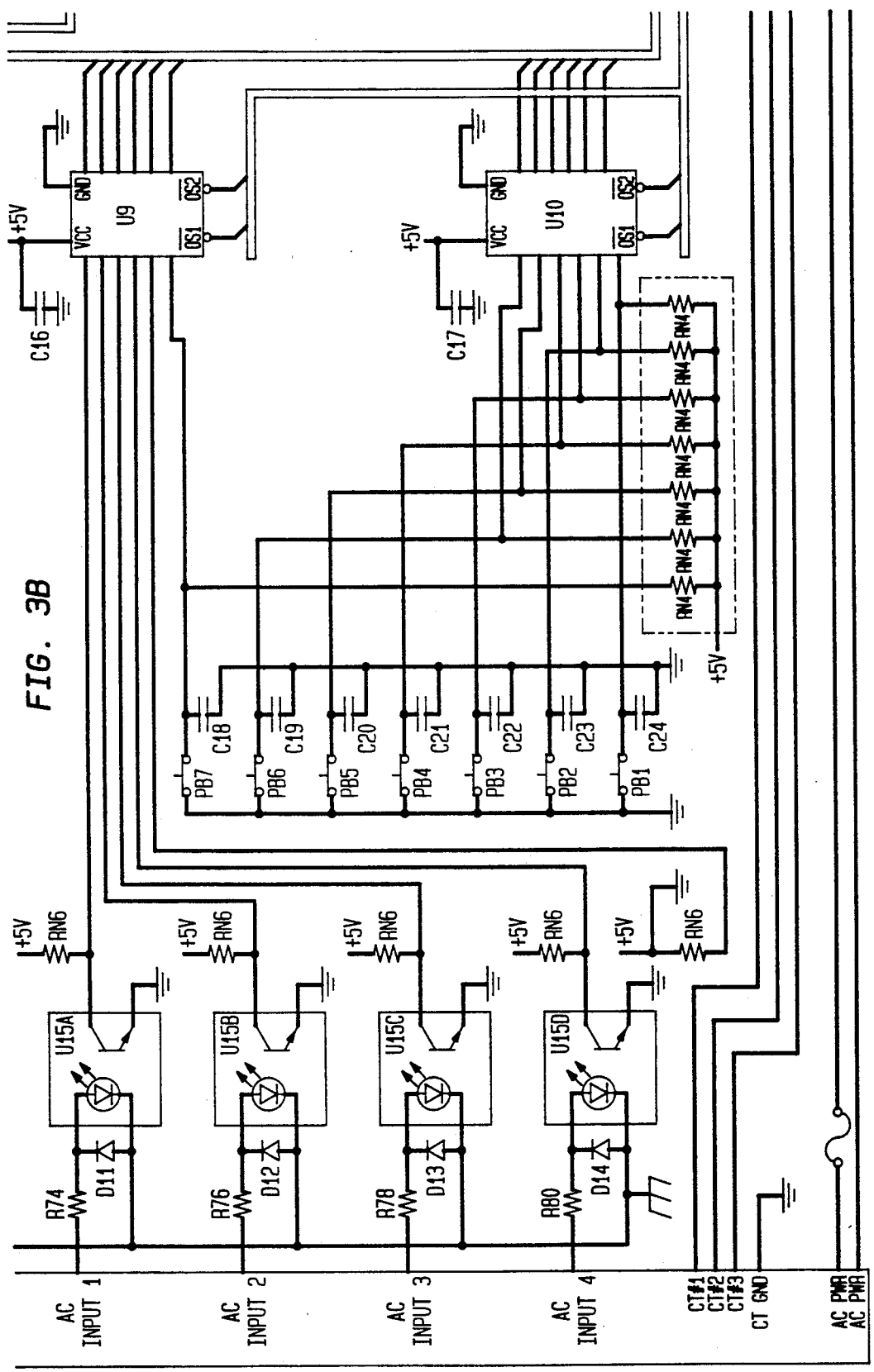
FIG. 3 is a circuit diagram of the preferred embodiment of FIG. 1, excluding the parameter set/display device, the external communications device, the remote inputs, the transformers, and the motor circuit.
Figure 3C:
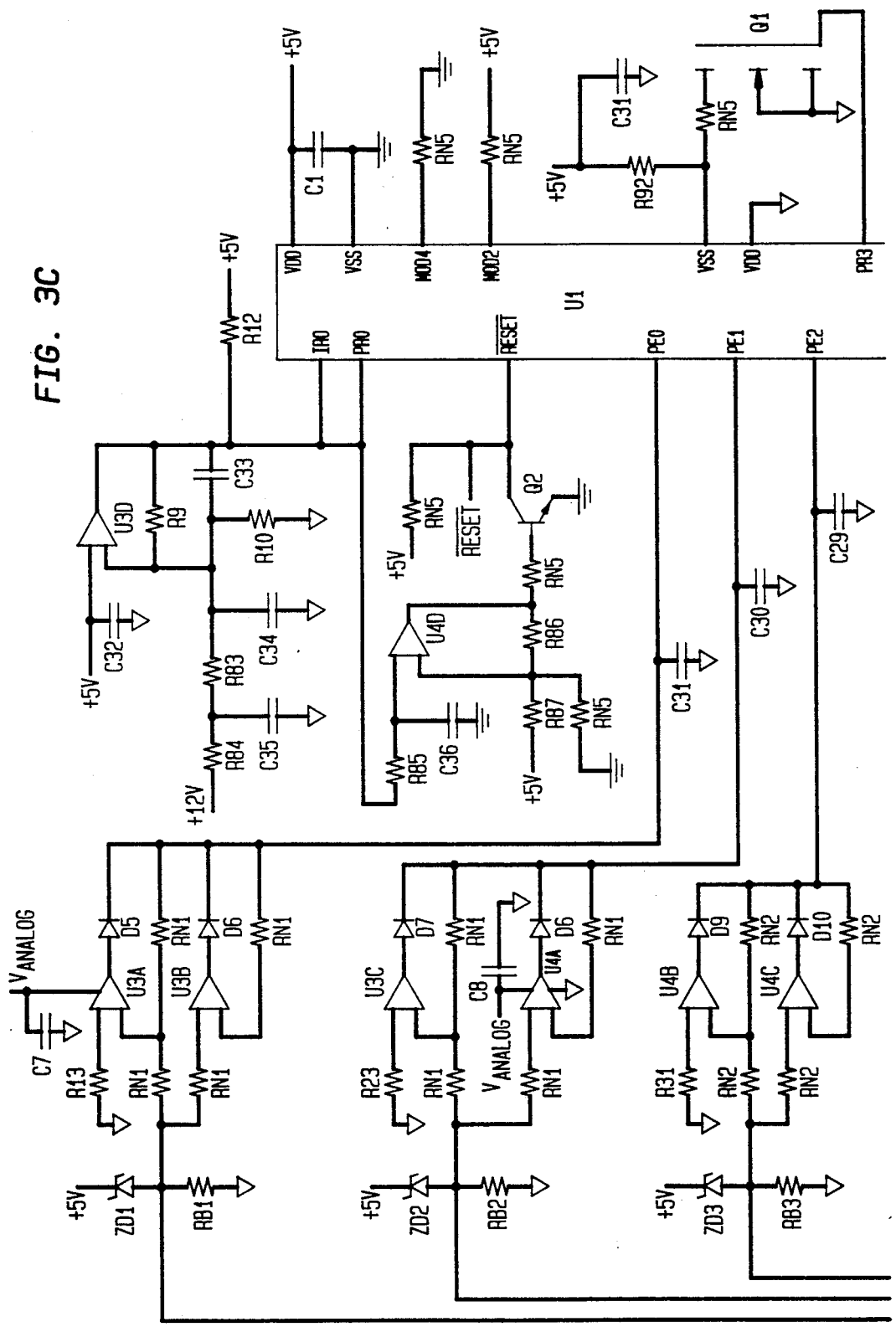
Figure 3D:
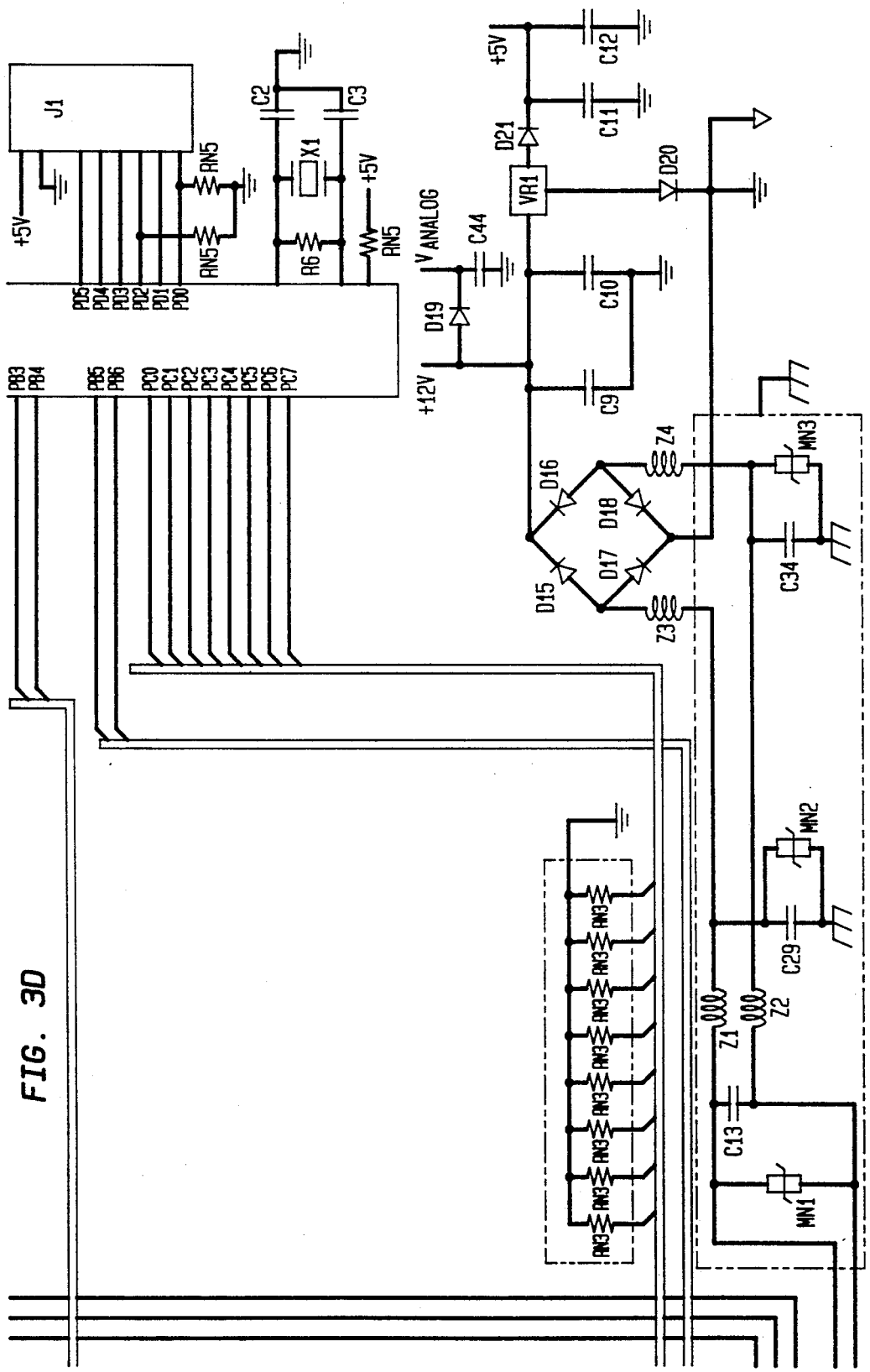

FIG. 3 illustrates in further detail the preferred embodiment of the invention in which the Motorola model MC68HC11 microcomputer operated in the single-chip mode is used as the programmable means. Although the microcomputer can also be operated in the expanded, multiplexed mode in which the program may be stored in external memory, such as ultraviolet-erasable programmable ROM (EPROM), it is anticipated that, for large-volume production, significant cost savings are realized by using the microcomputer's built-in memory, with the program stored in the masked ROM and the Boolean logic equations stored in the EEPROM. The microcomputer, U1 in FIG. 3, uses the external oscillator option recommended by the manufacturer. A crystal X1 with a resonant frequency of 8 MHz, capacitors C2 and C3, and a resistor R5 are connected to the microcomputer's EXTAL and XTAL inputs are shown. The external 8 MHz crystal results in an internal 2 MHz E-clock and 500 ns instruction cycle times. A power supply circuit, 120 in FIG. 1, couples 5 Vdc power to the microcomputer through its $V_{dd}$ and $V_{ss}$ inputs. Capacitor C1 reduces noise on the power input to the microcomputer. The MODA pin of the microcomputer is pulled low to ground potential through one resistor of resistor network RN5, while the MODB pin is pulled high to 5 Vdc through another resistor of RN5, selecting the single-chip mode of operation. The microcomputer's XIRQ pin is pulled high through yet another resistor of RN5, disabling the XIRQ interrupt. The following pins are unused and unconnected in the preferred embodiment: PA1, PA2, PA4, PA5, PA6, PA7, R/W, AS, PB0, PB1, PB2, PB7, PE3, and E.

The power supply circuit provides unregulated 12 Vdc and regulated 5 Vdc sources of power. The unregulated 12 Vdc voltage powers driver chips U5, U7, and U11, LEDs (LED1-14), opto-triac drivers U12-14, and any remote alarm connected to a terminal block TB1 across terminals labeled REMOTE ALARM and +12 V. Operational amplifiers in signal conditioning and powerfail/reset circuits are powered from $V_{analog}$, which is derived from 12 Vdc through a blocking diode D19. During a power failure, a capacitor C40 maintains the $V_{analog}$ voltage long enough for the powerfail/reset circuit to operate properly before power is lost. The regulated 5 Vdc level powers the rest of the circuits, including digital integrated circuit elements U6 and U8-10 and the set/display device, when connected.

A control power transformer, not shown in FIG. 3, supplies the power supply circuit with 12 Vac isolated from the motor circuit. Chokes I1-4, metal-oxide varistors MOV1-3, and capacitors C28-30 provide noise filtering and overvoltage protection to the power supply circuit, while a fuse F1 protects the circuit from damaging current levels. Diodes D15-18 constitute a full-wave rectifier with an unregulated output of 12 Vdc. Capacitors C9 and C10 are filter capacitors, with C9 shunting most of the ac ripple to ground. The unregulated 12 Vdc is connected to the input of a linear voltage regulator VR1, which produces the 5 Vdc level used to power the microcomputer and many of the logic circuits. A diode D21 prevents the 5 Vdc level maintained by a capacitor C13 from discharging into the regulator in the event of a loss of input power. Another diode D20 compensates for the voltage drop across diode D21. Capacitor C13 is a ridethrough capacitor that maintains the 5 Vdc logic voltage for at least 200 ms when input ac power is lost, giving the microcomputer enough time to save certain variables in EEPROM. A capacitor C11 provides further noise reduction on the 5 Vdc logic level.

The powerfail/reset circuit, 121 in FIG. 1, comprising operational amplifiers U3D and U4D, resistors R9-10, R83-87, and R12, three resistors from resistor network RN5, capacitors C32-36, and pnp transistor Q2, has two purposes:

1. to warn the microcomputer that the unregulated 12 Vdc has dropped below 9 V, so that an orderly shutdown sequence can be started, and 2. to reset the processor with a sharp reset pulse.

When the 12 Vdc supply voltage drops below about 9 V, the output of operational amplifier U3D, used as a comparator, drops low. Positive feedback produced by resistor R9 ensures a rapid, non-oscillatory low-going transition at the output. The falling edge on the IRQ pin of the microcomputer 123 generates an interrupt, which vectors program execution to a routine that begins an orderly powerfail shutdown. Capacitors C33-35 prevent noise or ripple from affecting the detection of a powerfail condition. The output of comparator U3D is also connected to input PAO. By reading PAO after saving certain variables in EEPROM, the program checks the status of the power supply. If the power supply has recovered by the time the saving procedure has finished, the microcomputer 123 continues normal program execution. If the power supply has not recovered, the shutdown sequence runs to completion.

Transistor Q2 drives the microcomputer's 123 RESET pin low about 200 ms after IRQ first goes low. Operational amplifier comparator U4D and its associated resistors R85-88 and capacitor C36 determine the delay. Resistor R86 ensures the start edge necessary for a solid reset. (A low-going transition on the RESET pin that tracks the MC68HC11's $V_{aa}$ voltage as it collapses can cause faulty program execution, which could result in the inadvertent erasure of portions of EEPROM.) During power-up, the powerfail/reset circuit 121 clears the outputs of latches U6 and U8, thereby turning off all LEDs and coil drivers.

The secondary windings of the current transformers CT101-103 in the motor circuit are connected to a signal conditioning circuit 118 in FIG. 1, comprising operational amplifiers U4A-C and U3A-C, zener diodes ZD1-3, diodes D5-10, capacitors C7-8 and C37-39, burden resistors RB1-3, discrete resistors R15, R23, and R31, and twelve resistors from resistor networks RN1 and RN2, by means of terminal block TB1. The secondary of one current transformer is connected between the terminal points labeled CT#1 and CT GND on TB1; the secondary of a second current transformer is connected between CT#2 and CT GND; the secondary of a third is connected between CT#3 and CT GND. The three current signals are applied to three identical absolute value circuits. Each circuit contains two operational amplifiers—one for the positive half-cycle and the other for the negative half-cycle of the signal waveform. The values of the burden resistors are chosen to give the appropriate voltage range for the application. Zener diodes ZD1-3 provide some protection from voltage spikes of either polarity. Positive spikes are clipped at just over 5 V by the forward-biased diodes; negative spikes are clipped at about −7 V by the zener action of the 12 V zener diodes.

The gain of the full-wave rectifier circuit 204 is unity, as determined by the input and feedback resistors of the operational amplifiers. Consider the operation of the circuit for one current signal. The secondary current of the current transformer connected between terminal CT#1 and CT GND produces a proportional voltage across burden resistor RB1. When the voltage is positive with respect to ground reference potential, unity-gain, non-inverting operational amplifier U3B produces a positive output that forward biases signal diode D6. The feedback path from the cathode of D6 to the inverting input(−) of U3B maintains the voltage at the cathode at the level of the output voltage. The output of complementary unity-gain, inverting operational amplifier U3A is driven to the ground rail by the positive input voltage. Diode D5 is reverse-biased and does not conduct. Therefore the output at the cathodes equals the input. For a negative voltage across the burden resistor, the situation is reversed. The output of non-inverting amplifier U3B is driven to ground, preventing D6 from conducting, while the output of inverting amplifier U3A maintains the voltage at the cathode of D5 at the level of the input, but with the opposite (positive) polarity.

The output of the full-wave rectifier circuit 204 is connected directly to the microcomputer's 123 analog input channel 0 PEO. The outputs of the other two identical circuits are connected to analog input channels 1 and 2 PE1-2. Capacitors C37-39 help filter the microcomputer's analog inputs for improved conversion results. Capacitors C7-8 filter the $V_{analog}$ supply of power to the operational amplifiers. The actual sampling and A/D conversion are performed by the microcomputer 123 internally.

Voltage divider resistors R91 and R92 and field-effect transistor (FET) Q1 make up a reference-switching circuit. The microcomputer's 123 PORT A bit 3 pin PA3 selects the reference voltage to be applied to the $V_{rh}$ pin (voltage reference high). When PA3 is low, the FET is turned off, preventing current from flowing through R91, thereby applying a reference voltage of 5 V at $V_{rh}$. When PA3 goes high, turning Q1 on, a voltage divider is formed by the two resistors. The 1:1 resistance ratio results in a voltage of 2.5 V at $V_{rh}$. The voltage at the $V_{rh}$ pin is the maximum analog voltage that the A/D converter 207 will convert. The value of the least significant bit (LSB) of an A/D conversion is $V_{rh}/256$. For $V_{rh}=5$ V, the LSB is worth 19.5 mV; for $V_{rh}=2.5$ V, the LSB is worth 9.76 mV. Thus, by switching the reference, more accurate conversions are possible at lower input current levels.

Local and remote input commands and conditions are read by the microcomputer over its PORT C pins PC0-7. Before reading the inputs, the program configures bidirectional PORT C as an input port and enables one of two tri-state inverting buffers U9 and U10 via PORT B lines PB6 and PB5. Buffer U10 buffers all but one of the local input commands. In the preferred embodiment, the local commands are entered by means of pushbuttons PB1-7 situated on the front of the physical package containing the microcomputer. Pushbuttons PB1-6 are connected electrically between the ground reference and the inputs of buffer U10, so that, when a pushbutton is depressed, its associated input of buffer U10 is connected to ground through the pushbutton. The inputs are pulled high to 5 V through resistor network RN4, so that a relaxed pushbutton results in a logic high at the input of the buffer. A logic low on pins OE1-2 from PB5 activates the outputs of buffer U10, allowing it to drive the PORT C bus. Because the buffer inverts its inputs, a depressed pushbutton causes a logic high at the appropriate PORT C input. A logic high on OE1-2 from PB5 disables the outputs of the buffer, making them high-impedance outputs. Capacitors C18-24 help debounce the pushbuttons by shunting the high frequencies results from switch bounce to ground.

Buffer U9 handles the PB7 pushbutton and four remote ac inputs. Remote ac input means are generally contacts or pushbuttons connected between a source of ac power and terminals labeled AC INPUT1-4 on terminal block TB1. When a remote contact is closed or a remote pushbutton depressed, an alternating current flows through the associated input of four-channel optocoupler U15. Resistors R74, R76, and R80, connected in series with the inputs, limit the input current. Diodes D11-14 provide current paths during the negative half-cycles of the ac input current. Each section of optocoupler U15 is effectively an isolated half-wave rectifier. The output of each for a closed contact or pushbutton is a zero-to-five-volt square wave at the line frequency (50 Hz or 60 Hz). The output for an open contact or pushbutton is an open collector pulled high to 5 V by its output pull-up resistor—one of the four resistors from resistor network RN4 connected from the 5 V supply voltage and the open collector outputs of the optocoupler U15. Each of the four outputs is applied to an input of buffer U9. A spare input to the six-input buffer U9 is provided by the pull-up resistor from network RN6 connected between the 5 V potential and input pin 12. Pushbutton PB7 is connected to buffer U9 just as PB1 is connected to buffer U10. The microcomputer 123 reads the remote ac inputs and the TEST/RESET pushbutton by enabling the tri-state outputs of U9 with a logic low at pins OE1-2 from PB6. The outputs of buffer U9 are disabled with a logic high at pins OE1-2.

To prevent contention on the PORT C bus, the program makes sure that no more than one buffer is active on the PORT C bus at any time and that PORT C is configured as an input while any buffer's output is active. The command input circuit is expandable to more inputs by connecting more buffers to the PORT C bus and unused PORT B lines to the enable pins OE1-2 of the additional buffers.

Besides reading the local and remote inputs, bidirectional PORT C also controls coil drivers and status indicators. When PORT C is configured as an output, data written to it can be latched into one of two eight-bit latches U6 and U8 by a rising edge on the respective CK input of the latch. A rising edge on PB3, which is connected to the CK input of U6, latches the data on PORT C into U6. A rising edge on PB4 performs the same function for latch U8. The outputs of the latches control seven-channel driver chips U5, U7, and U11. A high logic level at a driver input causes the driver to conduct, turning on the device connected to it. The output of each driver channel is the collector of an npn transistor with its emitter grounded. The circuit is expandable to more outputs by connecting more output latches to the PORT C bus and unused PORT B lines to the clock inputs CK of the additional latches.

Status indicators, such as light-emitting diodes LED-1-14, are driven by drivers U5 and U7. Each LED, except LED7, is driven by an individual driver channel. LED7, serving in the preferred embodiment as a general fault indicator, is connected so that it turns on whenever LED1, LED2, LED4, or LED5 turns on. To turn on LED1, for example, the microcomputer latches a logic high on PORT C pin PC2 into input D6 of latch U6 with a rising edge on PB3. The high logic level latched to the output of U6 turns on the associated driver channel of driver U5, causing its output transistor to sink current from the source of 12 Vdc through a current limiting resistor R54, LED7, and LED1. As a result, LED1 and Led7 are illuminated. The operation of LED2, LED4, and LED5 is similar. LED3, LED6, and LED11 are also driven by driver U5, but are not connected to LED7. Current limiting resistors R50, R51, and R53 limit the currents in LED3, LED6, and LED11, respectively. Three LED12-14 are driven in a manner similar to LED11, except by means of driver U7, latch U8, and a latching signal from PB4. Resistors R55-57 are the associated current limiting resistors. Three LEDs LED8-10 share a common current limiting resistor R52, because, in the preferred embodiment, only one of the three LEDs is typically on at a time. Provisions for a remote alarm indication in the event LED4 is turned on are made by connecting the output of the driver channel in U5 that drives LED4 to the TB1 terminal labeled REMOTE ALARM. A remote dc coil connected between REMOTE ALARM and the TB1 terminal labeled +12 V will be actuated whenever LED4 is turned on. A diode D19 and a metal-oxide varistor MOV4 protect the driver from high voltage transients generated remotely, such as by inductive kick from the coil.

The microcomputer can also drive remote contactor coils by means of latches U6 and U8, drivers U5, U7, and U11, and a coil driver circuit comprising optically-isolated triac drivers U12-14, triacs TR1-3, resistors R65-73, and capacitors C25-27. The coil driver circuit comprises three identical sections capable of independently actuating motor contactor coils connected to the circuit between TB1 terminals OUT1-3 and RETURN. Consider the operation of one of the coil drivers—the one driving the coil connected to OUT1. The microcomputer energizes the remote coil by latching a logic high at the output of latch U8 with a rising edge on PB4 and a logic high on PC1. The high at the output of the latch turns on the associated channel of driver U5, forward-biasing the LED in triac driver U14, which causes its internal triac to conduct and provide gate current to output triac TR3. The gate drive triggers TR3 on, energizing the connected motor contactor coil. Resistor R72 limits the triac driver's on current. Resistor R71 and capacitor C27 form a snubber network for the output triac to suppress high transient voltages that may occur upon switching.

The RxD and TxD pins PD0 and PD1 of the microcomputer are the input and output pins of the serial communications interface (SCI). The two lines are routed to external communications devices over a connector J1. The RxD and TxD lines, along with the +5 V and ground connections on connector J1, constitute a minimum configuration for one end of the asynchronous serial communications link labeled 127 in FIG. 1. For those applications requiring devices such as line drivers and receivers or optical isolators because of physical demands, such as long distance transmission or noisy environment, the requisite circuitry can be added external to the package containing the microcomputer, thereby eliminating unnecessary cost in those applications not requiring the additional circuitry. The other end of the communications link is a similar RxD and TxD pair of serial outputs and inputs from an external communications device 125. The two ends are typically connected through a multiple-conductor cable. Data is transmitted serially from the microcomputer to the external communications device from PD1 (TxD); serial data is received by the microcomputer from the external communications device through PD0 (RxD). The rate of serial data transfer (baud rate) is set by the operating program. Typical data transferred to the external communications device 125 includes the control status, the load current, and the motor protection setpoint values. Typical data transferred from the external communications device 125 includes control input commands, protection setpoint values, and the code implementing the Boolean equations representing the desired motor starter application.

Microcomputer pins PD2-5 compose the serial peripheral interface (SPI) through which the parameter set/display device, 119 in FIG. 1, is controlled. Electrical connection between the microcomputer and the set/display device 119 is made through connector J1 in FIG. 3 and connector J1 (FIG. 4). The SP1 is a synchronous serial communications interface with the microcomputer as the master controller and the set/display device as the slave. Data is transferred bit by bit between the master and the slave in eight-bit chunks. As one bit is shifted out of the master into the slave, one bit is shifted out of the slave into the master. During the shifting of bits, the microcomputer 123 outputs the SP1 shift clock signal SCK from PD4.

Consider the schematic diagram of FIG. 4. Various setting and requests for data to be displayed are made from the set/display device 119 by means of pushbuttons PB1-5. Examples of the setting and request functions are listed in Table 1. The method of selecting the functions is described later. The five pushbuttons PB1-5 are connected between ground potential and individual inputs of an eight-bit parallel-in-serial-out shift register U2. All of the inputs are pulled high to +5 V through individual resistors in a resistor network RN1. The status of the pushbuttons is latched into U2 by a logic high at the S/L input from the microcomputer's 123 SS pin PD5. A depressed pushbutton causes a logic low at the input, while a relaxed pushbutton results in a logic high. Extra inputs F, G, and H, are pulled high. The eight input logic levels latched into U2, representing the status of the pushbuttons, are shifted out of pin $Q_n$ by raising S/L high and activating the shift clock SCK. Eight clock cycles shift the contents of the output shift register of U2 into the microcomputer's 123 SPI data register. The bits are shifted starting with input H and ending with input A. Thus, the first three bits shifted in are always high as long as the set/display device is connected. Because the microcomputer's 123 MISO input, PD2 in FIG. 3, is pulled low through a resistor from resistor network RN5 in FIG. 3, eight consecutive low bits are read if the set/display device is not connected. The microcomputer 123 can tell whether or not the set/display device is connected from the states of the first three bits received.

While the pushbutton status is shifted into the SPI data register through the MISO input, display data are shifted out to a liquid-crystal display (LCD) driver U1 through the MOS1 output, PD3 in FIG. 3. The LCD driver contains a 35-bit input shift register. The first bit shifted in is always a logic high—the start bit. When the 36th bit is shifted in, the start bit is shifted out of the input shift register, loading the following 33 bits into the display latch of U1 to display the selected characters and clearing the shift register. The outputs of the LCD driver are connected to individual segments of a four-character, seven-segment LCD (LCD1). The 35 output bits include four characters by seven segments, three decimal point bits, and four trailing null bits. The LCD's backplane is driven from the driver's BP OUT pin. A resistor R1 and a capacitor C2 determine the frequency of the backplane oscillator internal to the LDC driver.

Power to drive the components on the set/display device 119 is derived from the master controller over J1 pins 1 and 2, labeled +5 V and GND. A capacitor C1 reduces noise that may appear on the 5 V power lines. A capacitor C3 is a by-pass capacitor for U2.

The microcomputer performs the described functions by executing instructions, constituting the operating program, stored in its memory. The program can be written in the assembly language of the MC68HC11, but most of it was written in the high-level 'C' language to minimize software development time.

The operating program comprises nine interrupt service routines, one background routine, and two short routines that run on reset. Five of the interrupt routines run at regular intervals as scheduled using the MC68HC11's programmable timer, a 16-bit timer that permits the timing of events from 0.008 ms to 524.288 ms. Interrupts, for example, are scheduled using the timer in conjunction with output compare registers TOC1-5. The five timed interrupt routines, in order of priority, are:

1. isr_ad (A/D conversion routine on the load currents)
2. isr_inputs (Input scan routine)
3. isr_hand (Set/display device input/output routine)
4. isr_eesave (EEPROM update during powerfail)
5. isr_timer (Long-term timer routine)

A sixth interrupt routine (isr_eeupdate) compares the parameter setpoint images in EEPROM with the actual values in RAM and updates the EEPROM as required. The routine is bid by the realtime clock interrupt.

A seventh interrupt routine (isr_shutdown) attempts an orderly shutdown in the event of a fault in the microcomputer, or central processing unit (CPU). An interrupt is generated, which vectors program execution to the shutdown routine, under any of the following conditions.

1. CPU watchdog timeout.
2. CPU clock failure.
3. Illegal opcode trap.

The routine sets the CPU and FAULT flag bits for the background task's fault logic.

An eighth interrupt routine (isr_powerfail) is bid by an external interrupt generated whenever the 12 Vdc power supply voltage drops below about 9 V. The powerfail routine starts the EEPROM update routine (isr_eesave). If, after the EEPROM is updated, the control voltage remains below 9 V, isr eesave sets the FAULT bit for the background task's fault logic. If the control voltage has recovered, standard program execution continues uninterrupted.

A ninth interrupt routine (isr_sci) handles asynchronous serial communications with external devices. The routine is bid by interrupts generated by the SCI system upon various transmit and receive conditions.

Unless explicitly unmasked in one of the interrupt routines, neither the timed interrupt sources, the SCI interrupt, not the external powerfail interrupt will interrupt the execution of the executing interrupt routine, regardless of the priority of the executing interrupt routine or of the interrupting source.

The background routine (main) continuously loops, processing data passed to it by the interrupt routines and responding appropriately. Whenever an interrupt routine is not being serviced, main is actively being executed. Upon a power-up reset, main initializes the stack pointer and configures the ports and registers of the microcomputer before activating the background loop. The loop handles the following:

1. Initialization upon reset (initializes the internal registers and variables, configures the CPU timers, kicks off the timed interrupt system, primes the SPI, starts the A/D conversion process, and turns the READY LED on).
2. Logic solution (handles fault conditions and translates the pushbutton and remote inputs into appropriate outputs).
3. Set/display device (changes and retrieves data as requested or needed by the isr_hand interrupt service routine).
4. Serial communications messages (processes setpoint changes received over the serial communications link and formats for transmission messages bid regularly by isr_timer).

Each of the background tasks is usually bid by an interrupt service routine, which sets a calling flag upon detection of an appropriate calling condition. The flag is usually cleared by the background task upon completion of this execution or disappearance of the calling condition.

After a power-up reset, the first routine to run after the two brief reset routines is main. This routine first takes care of some housekeeping chores before execution reaches the background loop. The loop is a circular sequence of tasks. Each task is executed in order as long as its calling bit is set. If a task's calling bit is not set, the task is skipped and the next task's calling bit is checked. After the last task is executed or skipped, the first task's calling bit is checked, completing the loop. All the background tasks may normally be interrupted by any source. Maskable interrupts can be held off only if interrupts are explicitly disabled in the background program. The most important housekeeping chore performed by main prior to executing the background loop is setting the INITIAL calling bit to bid the initialization task to run.

There are two reset routines: .reset and .startup. The 'C' startup routine (.startup) is always inserted in the program by the 'C' linker during program development. The stack pointer is initialized in the startup routine. The routine main is called as a subroutine from the startup routine. Because main includes the continuous background loop, execution does not return to the startup routine from main. Some of the registers in the MC68HC11 must be written to within the first 64 E-clock cycles after power-up or not at all. The code to do this, written in assembly language and labeled .reset, is vectored to upon power-up reset. After initializing the appropriate registers as required, the routine causes execution to jump to the 'C' startup routine.

Figure 6A:
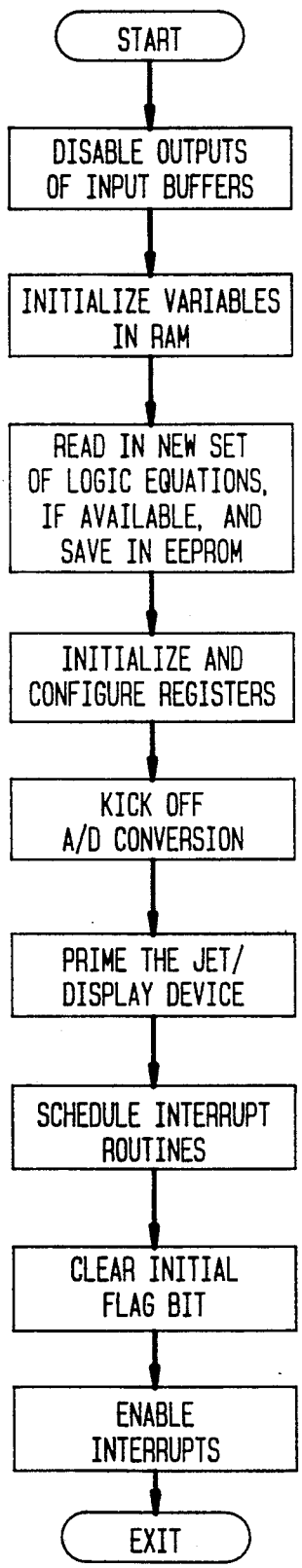

The routine main includes the background loop, as shown in the flowchart of FIG. 5. Main is entered upon a power-up reset by being called from the 'C' startup routine. Main first sets the INITIAL flag to bid the initialization task, shown in the flowchart of FIG. 6a, to run. After setting the INITIAL flag, execution proceeds to the background loop.

First, the background loop checks the INITIAL flag. If the INITIAL flag is set, which occurs after a power-up reset, the initialization task runs. After first disabling the outputs of the hardware input buffers U9 and U10 in FIG. 3, the task initializes certain variables in RAM either to constants stored in ROM, to zero, or to values saved in EEPROM. Examples of variables initialized to values saved in EEPROM include the setpoints, the elapsed run time of the motor, the number of motor starts, and the number of overload trips. The task sends out over the SCI a message requesting an external communications device to transmit logic equation code to reconfigure the application. If the external device does not respond, the configuration remains as it is. If the device responds by transmitting new logic equation code, the task reads the new code and programs it into EEPROM. The task then configures the microcomputer's 123 internal registers for the desired operation. Important examples include enabling the SPI and setting its shift clock rate, setting the realtime clock rate, unmasking the programmable timer and realtime clock interrupt flags, and turning on the READY LED, LED11 in FIG. 3, indicating the microcomputer is running. Then the A/D conversion 207 system is activated and its interrupt routine scheduled. Before clearing the calling flag INITIAL and enabling the timed interrupt system, the task primes the SPI that controls the set/display device 119. The initialization task is then exited.

After a new set of readings of input commands is made, interrupt service routine isr_inputs sets the calling flag SOLVE to bid the logic solution task to run. The logic solution translates local pushbutton, remote contact, and input commands received over the communications link into LED indicator and coil driver outputs.

The program code for all inputs and outputs that are not common to all motor starter applications contemplated is stored in the microcomputer's EEPROM. Code common to all applications is stored in ROM. The code stored in EEPROM is executable code implementing the Boolean logic equations for the particular application and written in assembly language to conserve memory space.

Figure 6C:
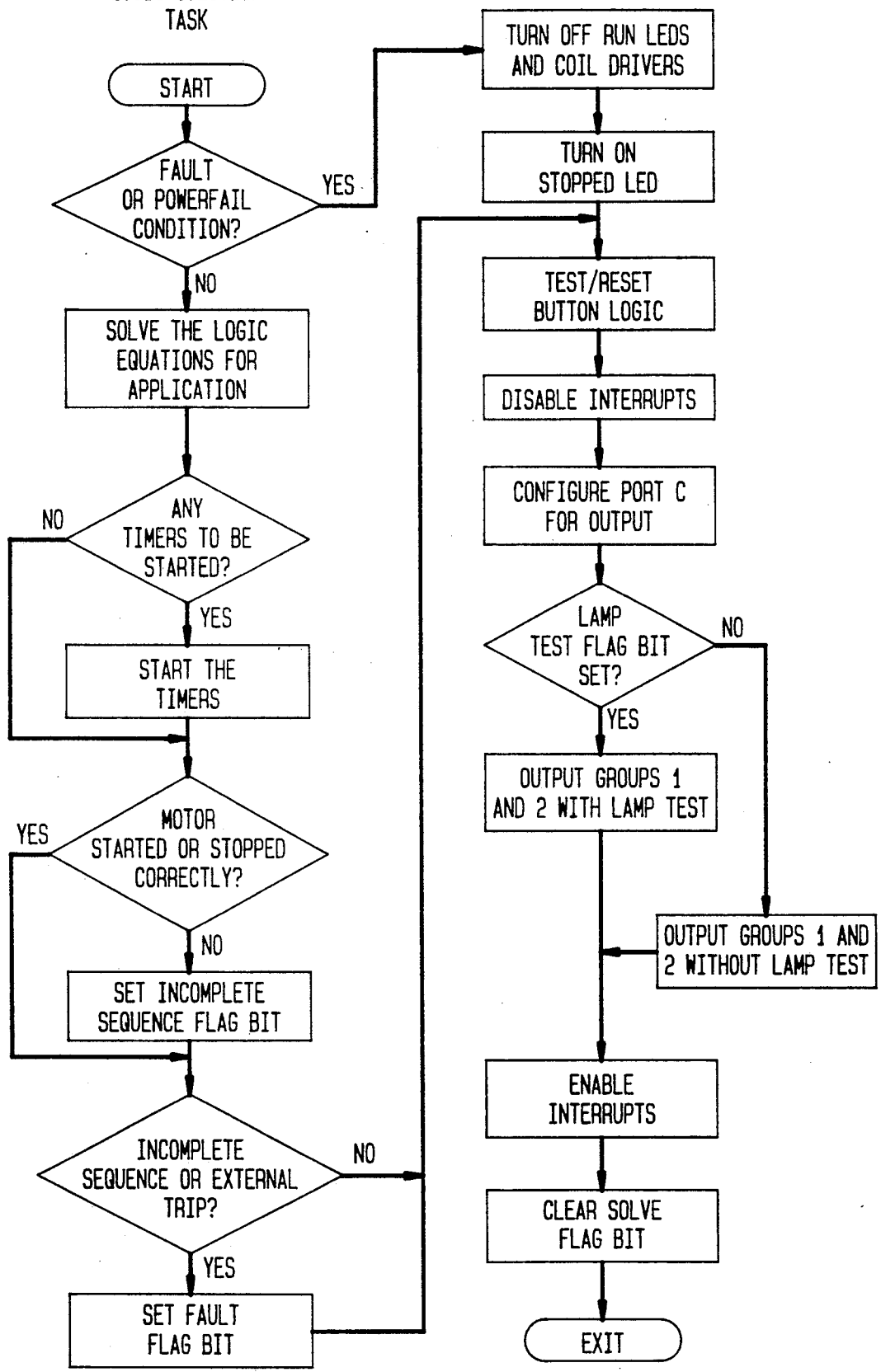

The logic solution task, as shown in FIG. 6c, first checks the FAULT and POWERFAIL flags to see whether a fault or an imminent powerfail condition exists. If so, the LEDs and coil drivers are turned off and the STOPPED LED turned on, and execution proceeds to the TEST/RESET pushbutton logic. If not, the Boolean logic equations for the particular application are solved. The logic equation code, stored in EEPROM, is executed as a subroutine called from the logic solution task. The subroutine does most of the translation from inputs to outputs. The triggering of certain timing functions, such as a transition timer and an incomplete sequence timer for reduced-voltage starters, externally settable timer #1, and externally settable timer #2, is handled by the logic equation code. Because all four timers mentioned are started by control commands or motor events, the logic equation program decides when the timers should start and what action to take when they time out. The program sets a flag bit corresponding to the timer to be started. Execution returns from the logic equation code in EEPROM to the common logic solution code in ROM.

The flag bits to start the timers are checked. If any is set, the program starts the timer by setting the appropriate timer active flag bit and the timeout time. The long-term timer interrupt routine isr_timer handles the timing. The logic solution task then checks to make sure that motor start and stop commands were executed correctly. If a stopped motor is commanded to start, load current should be detected within one second. If motor current is not detected, the program sets the incomplete sequence IS flag bit. If motor current is detected, the number of starts, which is an important factor of the life of the contactor, is incremented. The number of starts is available for monitoring through function F18 (see Table 1) of the set/display device 119. On the other hand, if a running mo or is commanded to stop and load current does not drop to zero within one second, the IS flag bit is set. After checking for these start/stop faults, the task checks for the occurrence of incomplete sequences or external trips by testing the IS and EXT flag bits. The IS flag may be set by the logic equation code upon unsuccessful completion of the transition in reduced-voltage starter applications or as just described for start/stop faults. The EXT flag bit is set by the logic equation code for those applications having an external trip input as one of the remote input assignments. If either flag bit is set, the FAULT flag bit is set, which causes the program to bypass certain normal operations.

The logic solution task next executes the TEST/RESET pushbutton logic. In the preferred embodiment, pushbutton PB7 in FIG. 3 is dedicated as the TEST/RESET button. The program uses one of the long-term timers controlled by isr_timer to determine whether the button has been depressed for the class time set in memory, initiating an overload test by setting the OLTEST flag bit. If the TEST/RESET button is released before the timer times out or if the motor is running, the LAMPTST flag bit is set, bidding the lamp test. Another long-term timer is used to time the lamp test, which turns on all the LEDs for two seconds.

The next function performed by the logic solution task is latching the output actions to the LED and coil drivers. The computed outputs are sent via PORT C. To avoid conflicts with the reading of the inputs over bidirectional PORT C, interrupts are first disabled, which suspends isr_inputs, the routine that reads the inputs. Then PORT C is configured as an output, and the first output group is written to PORT C and latched into latch U6 in FIG. 3 with a rising edge on PB3. The procedure is repeated for the second output group with PB4. If the LAMPTST flag bit is set, the LEDs are turned on. Interrupts are then re-enabled and the calling flag bit SOLVE cleared.

Figure 6D:
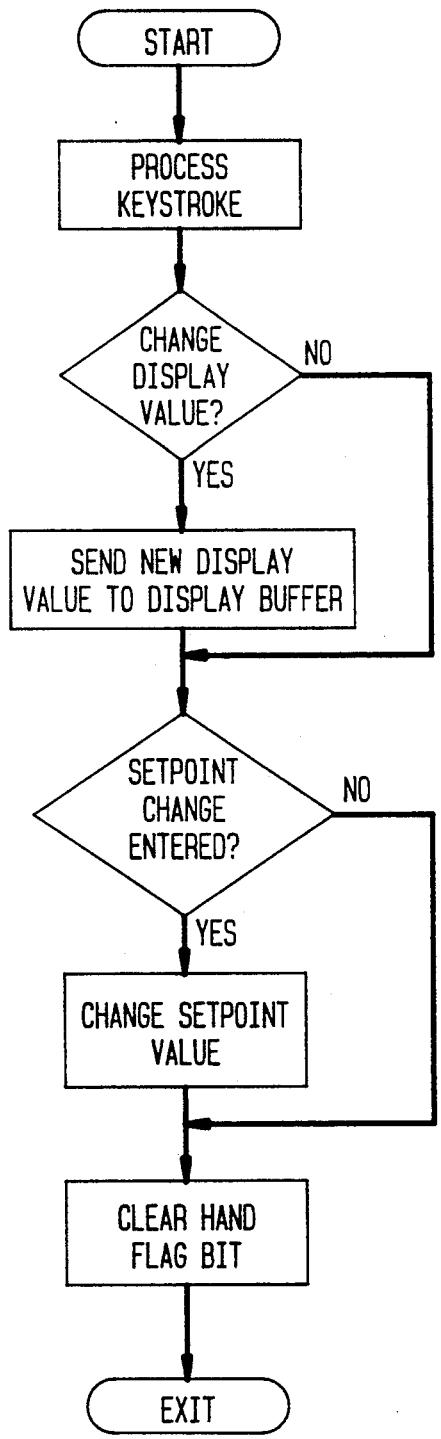

The set/display task, shown in the flowchart of FIG. 6d, is bid to run by the set/display interrupt routine isr_hand. Besides setting the calling flag bit HAND, the interrupt routine sends the background task the latest keystroke entered from the set/display device 119. The background task detects the set HAND flag bit, decides what action the keystroke requires, and sends to the interrupt routine four bytes representing the four characters to be sent to the set/display device's liquid crystal display.

The task controls the sequences displayed on the LCD, makes sure that proper commands are entered, selects the value or message to be displayed on the LCD, and makes setpoint changes as required. Upon completion, the task clears the calling flag bit HAND.

To make the design of the set/display device 119 simple and inexpensive, only five pushbuttons, labeled FUNCTION, DISPLAY, DOWN, UP, and ENTER, are used. The set/display task controls what is displayed. The use of each pushbutton is best understood from an example, such as setting timer #1 to 47 seconds. When connected to the microcomputer 123, the set/display device 119 displays either a function number from Table 1 or a display or setpoint value for one of the functions. If, for example, the LCD is displaying "F22", meaning that function 22 (jam protection) is ready to be operated on, one of the scroll buttons (UP or DOWN) must be used to scroll to the desired function, F7 (timer #1). Scrolling in either direction is possible. If the UP button is pressed, the display changes from "F22" to "F23". If the UP button is held in, the display will change to "F24", then to "F1", then "F2", and so on, scrolling consecutively through the functions. When the displayed function is "F7", the button should be released. Depressing the DISPLAY button causes the existing setpoint value to be displayed, in this case, for example, "52", which represents a timer setting of 52 seconds. The displayed value may be decremented through the possible choices for the particular function by depressing the DOWN pushbutton. The UP button increments through the possible values. For timer #1, the possible choices are every second from 0 to 100 seconds. If the DOWN button is depressed and held in, the display will decrement from "52" to "51" to "49" and so on. The button should be released when the desired setpoint value, "47" in this case, is reached. At this point the new setpoint can be entered by pressing the ENTER button. IF the DISPLAY button is pressed instead, the existing setpoint, "52", is displayed. If the FUNCTION button is pressed, the function, "F7", is displayed. Only if the ENTER button is pressed with a setpoint value in the display is the setpoint changed. For those functions that merely display some quantity, such as load current, pressing the ENTER pushbutton has no effect. To speed up the process of changing setpoint values, provisions are made for fast scrolling. If the UP or DOWN button is held in, the function or the setpoint selections will be scrolled through at a faster rate. The example shows how the set/display background task controls the setting of various motor parameters and the display of various measured quantities with a minimum of hardware in the set/display device.

At the completion of the set/display task, the background routine checks the status of the INITIAL calling bit, restarting the loop.

Figure 7:
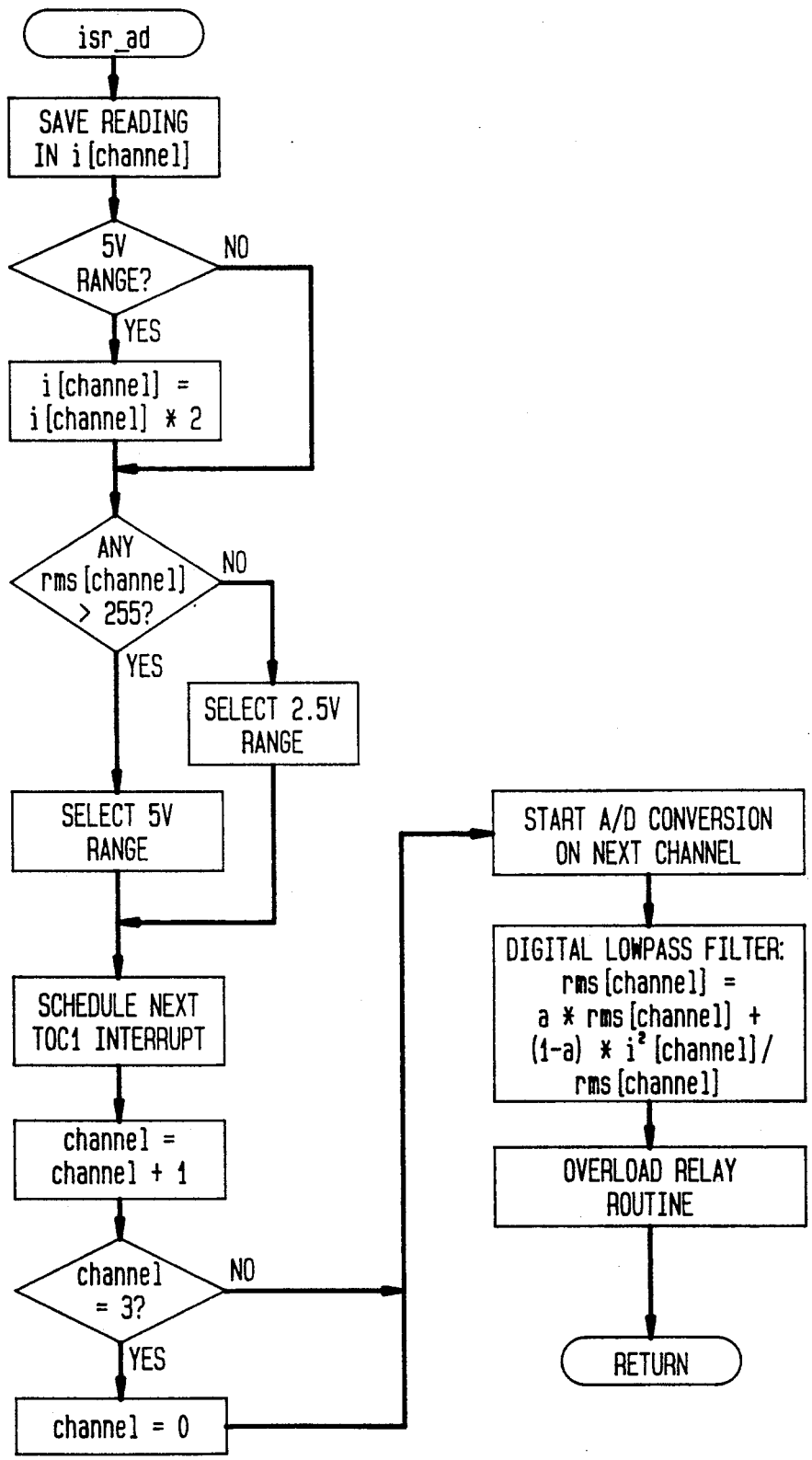

The A/D conversion routine (isr_ad), whose flowchart is shown in FIG. 7, runs at a rate of three times 171 Hz, the sampling frequency selected based on the criteria previously mentioned. The MC68HC11's converter is configured for single-channel, non-continuous operation by clearing the SCAN and MULT bits in the A/D control/status register ADCTL. Consequently, upon the completion of each conversion cycle, which is indicated by the microcomputer's setting of the conversion complete flag bit (CCF) in ADCTL, the eight-bit results of the conversions on the selected channel are stored in the A/D result registers ADR1-ADR4.

The routine reschedules itself by means of output compare timer TOC1 to run three times every 1/171 Hz, or 1.95 ms. Each time the routine runs, one of the three load currents is converted. In other words, each load current waveform is sampled every third time the routine runs, or at a rate of 171 Hz.

Range switching has been implemented to yield greater accuracy. By switching the reference voltage from 5 V to 2.5 V by means of the range-switching circuit described earlier, greater accuracy is achieved. For a 5 V reference, the LSB is worth 19.5 mV; for a 2.5 V reference, the LSB is worth 9.76 mV. To scale the readings correctly, all readings made with the reference at 5 V are multiplied by two (shifted left once) before being combined with the readings for a 2.5 V reference in the calculation of the rms value of the load current. The criterion for range switching is based on the highest calculated rms value of the three load currents. If the highest value is greater than 256 binary counts, which corresponds to a voltage of 2.5 V at the input to the A/D converter, a 5 V reference voltage is needed to prevent saturation of the converter. In such a situation, the routine selects the 5 V reference with a logic low at PA3 in FIG. 3. Otherwise, a 2.5 V reference voltage is selected with a logic high.

The A/D converter does not generate an interrupt upon completion of a conversion. The microcomputer marks the completion of a conversion cycle by setting the CCF flag bit in ADCTL. Because a conversion cycle takes about 0.06 ms, it is reasonable to expect the conversion to be complete by the time the isr_ad routine runs again about 1.95 ms later.

After reading the converted value, selecting the reference setting, scheduling the next interrupt, and starting the next conversion, isr_ad computes the rms value according to the difference equation described previously.

Figure 8:
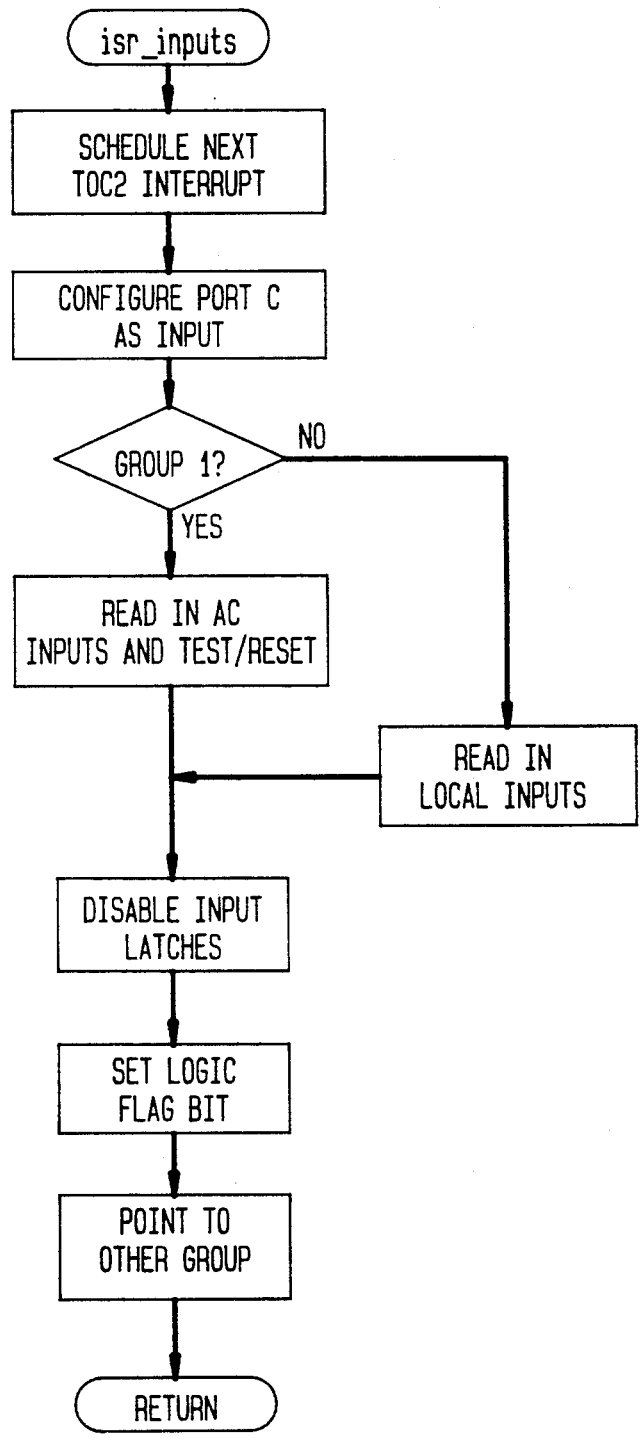

The input scan routine (isr_inputs), whose flowchart is shown in FIG. 8, reads over bidirectional PORT C the local pushbutton and remote contact inputs. Input GROUP 1, which includes the four remote ac inputs and the front panel TEST/RESET pushbutton input, is read by enabling the input buffer, U9 in FIG. 3, with a logic low on PB6. Input GROUP 2, which comprises the remaining local pushbutton inputs, is read by enabling U10 with a low on PB5. The scan routine alternates between the two groups, reading one each interrupt. The routine reschedules itself to run with output compare timer TOC2, configures PORT C as an input port, reads one of the two groups on each pass, deselects the buffers (i.e., returns them to tri-state with a logic high on PB5 and PB6), and sets the SOLVE calling flag bit to bid the logic solution task to run. The logic solution task is bid to run in the background every other TOC2 interrupt. Thus, the logic equations are solved every time a new reading of all the inputs is completed.

The rate at which isr_inputs runs is determined by two factors. First, the pushbuttons should be read often enough so that a typical button depression is detected by at least two consecutive readings. Second, the ac inputs must be detectable at both 50 Hz and 60 Hz. The difficulty in detecting an ac input is that the signal out of the optoisolator, U15 in FIG. 3, is a zero-to-five-volt square wave at 50 Hz or 60 Hz when the remote contact or pushbutton is closed. Analysis of 50 Hz and 60 Hz square waves shows that, if sampled every 27.5 ms, at least one of every three consecutive samples is from the zero-volt section of the waveform. The presence of a zero-volt section distinguishes the closed condition from the open condition. Consequently, the interrupt rate for isr_inputs was chosen to be half that, or 13.75 ms.

While the background loop processes inputs from and determines outputs to the set/display device 119, the interrupt service routine isr_hand actually reads in the inputs and sends out the outputs. FIG. 9 is the flowchart of isr_hand. Each time it reads the set/display pushbuttons, isr_hand simultaneously outputs eight bits to the LCD driver chip, U1 in FIG. 4. The routine reschedules itself to run every 30 ms by means of output compare timer TOC3. The rate is fast enough to update the LCD at a pleasing rate and to scan the pushbuttons often enough so no depressions are missed.

The set/display device 119 is controlled by the MC68HC11's serial peripheral interface (SPI) with the microcomputer 123 as the master and the set/display device 119 the slave. Data are shifted out serially over the MOSI line to the LCD driver and shifted in over MISO from the pushbutton's parallel-in-serial-out shift register, U2 in FIG. 4. A group of eight bits is shifted out at each transfer. Upon completion of the transfer, the eight bits written to the LCD are replaced in the SPI data register by the eight bits shifted in from the pushbutton's shift register.

When the routine begins after a TOC3 interrupt, the SPI data register contains the most recent reading of the pushbuttons. The interrupt routine first unlatches the shift register with a logic low on the S/L input, then schedules the next interrupt. To clear the SPI transfer complete flag bit in the SPI status register SPSR, the SPSR register must first be read. The flag bit is then cleared when the data register SPDR is read. The contents of the data register represent the set/display pushbuttons. Furthermore, the three most significant bits of the pushbutton shift register are pulled high. The routine determines whether or not the set/display device 119 is connected by checking those three bits. If they are not read as high, the device is presumed to be disconnected and no processing is required. If the set/display device is determined to be connected and a button depressed, the calling flag HAND is set, bidding the background task to process the pushbutton data. The buttons are prioritized in the following order: FUNCTION, DISPLAY, DOWN, UP, ENTER. If more than one button is depressed, only the one with highest priority is processed.

After reading the input, isr_hand initiates the next data transfer. First, the pushbuttons are latched into the shift register with a logic high at the S/L input. The next eight bits to be transferred to the LCD driver are written to the SPI data register, automatically starting the transfer. The SPI system in the microcomputer 123 takes over and shifts out eight bits to the LCD, while shifting in eight bits from the pushbutton shift register. The shifting process is completed long before isr_hand runs again.

One complete output to the LCD driver is five bytes long. The first four bytes comprise a start bit (a logic high), three decimal point bits (high for on), and the four seven-segment character bits. The fifth and final byte is a null byte used to complete the shift in the LCD driver's shift register. The background task formats the first four bytes to be transferred according to the characters to be displayed. The interrupt routine isr_hand adds the start bit and outputs the null byte.

To permit the convenient timing of events that take much longer than the overflow times of the programmable timers inherent in the MC68HC11, the isr_timer interrupt service routine was written. The routine, as shown in the flowchart of FIG. 10, reschedules itself to run every 0.1 s with output compare timer TOC5. The routine increments a 16-bit programmable timer (rtc_counter) every time it runs, i.e., every 0.1 s. Eight compare values (time [0]-time[7]) analogous in operation to the built-in programmable timer and the output compare registers, are available to time eight different events from 0.1 s to 6553.6 s in duration.

To activate a timing sequence, one of the routines sets the timer active bit for the appropriate time value to be compared and sets the time value to the appropriate compare value. If, for example, a two-second event is to be timed using the time[7] compare value, the routine starting the timing sets the timer active bit for timer 7 and loads the timeout time into time[7] by adding the offset time to the current time given by the contents of the timer rtc_counter. In this example, time[7] is set to value of rtc counter plus 20. The value of 20 is used because two seconds is 20 tenths of a second. Every time the isr_timer runs, every 0.1 s, the rtc counter is incremented by one. Because the timer active bit for time[7] is set, isr_timer compares the value in time[7] with the value in rtc_counter. When the values are equal, the isr_timer routine clears the active bit and sets the timeout bit, which can be used by any routine relying on the timeout.

As previously mentioned, eight timers are programmed into the preferred embodiment. The assignments of the timers are as follows:

| | |
|---|---|
| time[0]: | set/display timer #1 |
| time[1]: | set/display timer #2 |
| time[2]: | TEST/RESET button timer (used to determine whether the button is depressed for the overload class time) |
| time[3]: | lamp test timer (set for two seconds to time the duration of the lamp test) |
| time[4]: | start/stop fault timer (set for one second to wait before checking the current after the motor is started or stopped); incomplete sequence timer (set for one second after the transition output command is given in reduced-voltage starter applications to make sure the seal-in contact closure indicating a successful transition is made) |
| time[5]: | transition timer for reduced-voltage applications (set after a start command for the time the transition is to be made) |
| time[6]: | motor spindown timer (set to 60s, the minimum time that must elapse after a motor is stopped before it may be restarted) |
| time[7]: | unassigned |

The motor elapsed running time is also incremented by isr_timer. As long as the motor is energized, the runtime is incremented every 0.1 s. The elapsed run time can be displayed on the set/display device 119 through request function F17 of Table 1. Data messages transmitted over the SCI to an external communications device 125 are scheduled by isr_timer. Each time the routine runs, it sets the calling bit MESSAGE, which bids the background task to format another data message for transmission. Finally, the long-term timer routine writes the byte $55, followed by $AA, to the MC68HC11's watchdog timer register COPRST to prevent it from timing out and generating a watchdog timeout interrupt. The watchdog is initialized to time out in 262 ms if not reset as described.

The shutdown routine, shown in the flowchart of FIG. 11, runs in the event of any of three interrupt sources: a) watchdog timeout, b) clock failure, c) illegal opcode trap. Upon the occurrence of any of these events, program execution is vectored to the shutdown routine isr_shutdown, which sets the CPU FAULT bit to turn on the CPU FAULT LED and the FAULT flag bit to bid the background task to stop the motor.

The shutdown routine initiates an orderly shutdown after a CPU malfunction. A watchdog timeout occurs if the isr_timer routine does not reset the watchdog within 262 ms, as it should under normal operating conditions. An illegal opcode trap occurs if program execution gets lost somehow. A clock failure occurs if the crystal clock frequency drops too low. All of these events are unusual and generally indicate a hard failure in the microcomputer 123 or associated circuitry.

Figure 12B:
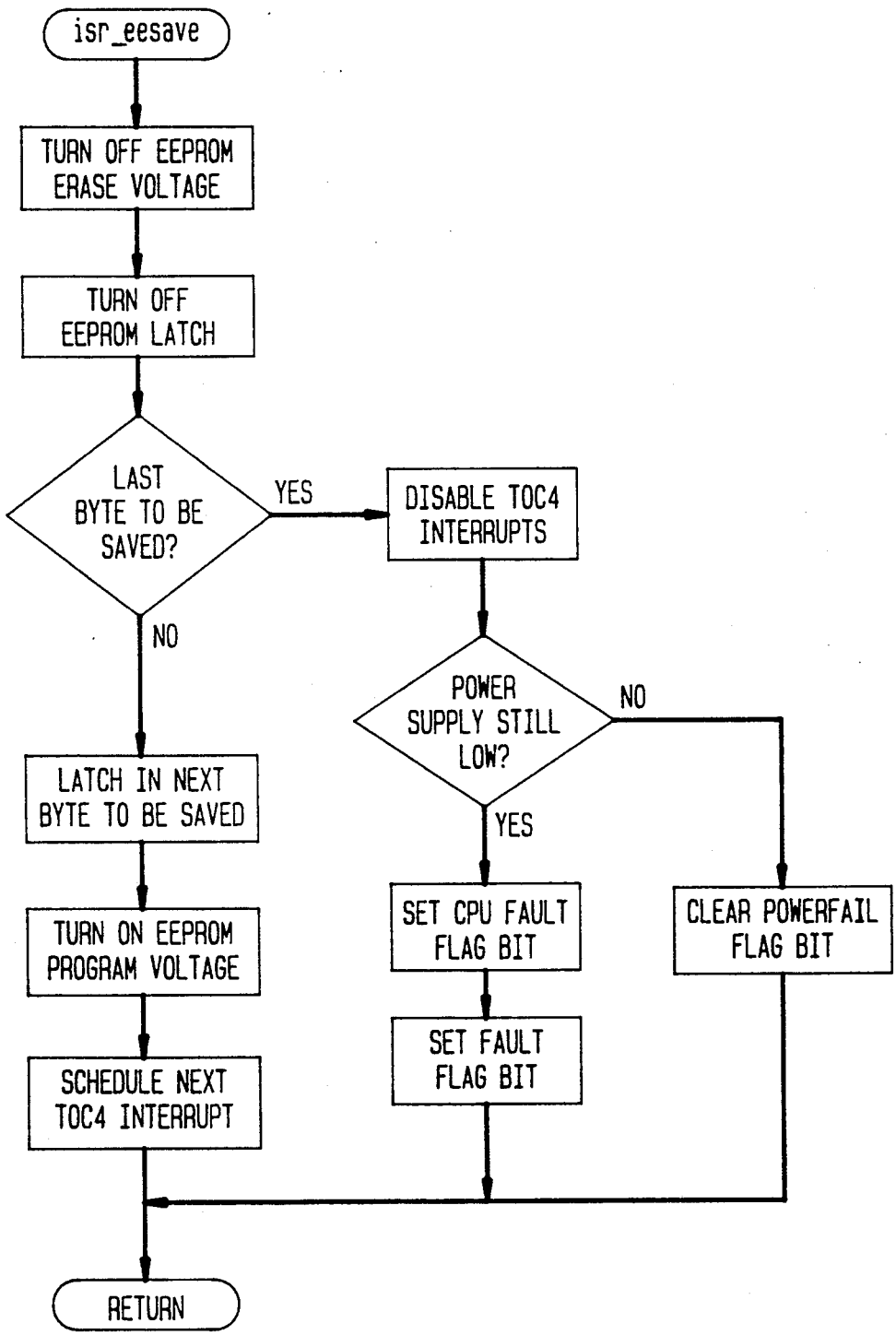

Whenever the control voltage drops below about 9 V, the powerfail/ reset circuit drives the IRQ pin on microcomputer 123 low, the falling edge generating an interrupt. The IRQ interrupt is serviced by vectoring execution to isr_powerfail, whose flowchart is shown in FIG. 12. The routine initiates the procedure of saving certain variables in EEPROM in case a loss of power actually ensues by first initializing RAM and EEPROM pointers to the first variable to be saved. The RAM and EEPROM save areas are equal-sized blocks of memory with the variables saved in the same order in each. After initializing the pointers, the routine erases the row (16 bytes) of EEPROM containing the block of variables and schedules, using output compare timer TOC4, interrupt routine isr_eesave to start to run 10 ms later. Finally, isr_powerfail sets the PWRFAIL flag bit, indicating to other routines that a loss of power is imminent.

The first time it executes after being scheduled by the powerfail routine, isr_eesave copies the byte in RAM pointed to by the RAM pointer into the corresponding EEPROM location pointed to by the EEPROM pointer. Because the EEPROM programming procedure takes 10 ms to program each byte, isr_eesave reschedules itself with TOC4 to run again in 10 ms. Each time a byte is programmed from RAM into EEPROM, the pointers are incremented so that they point to the next byte to be saved. After the last byte is saved, PORT A bit 0, which is connected directly to the IRQ pin, is read. If the logic level is still low, indicating that the power supply voltage is still below 9 V, isr_eesave sets the CPU FAULT bit and the FAULT flag bit to bid the background fault logic. If the voltage has recovered at the completion of the updating of the EEPROM, program execution continues normally. In either case, once the last byte to be saved is programmed into the EEPROM, isr_eesave does not reschedule itself to run. The flowchart is shown in FIG. 12.

Figure 13:
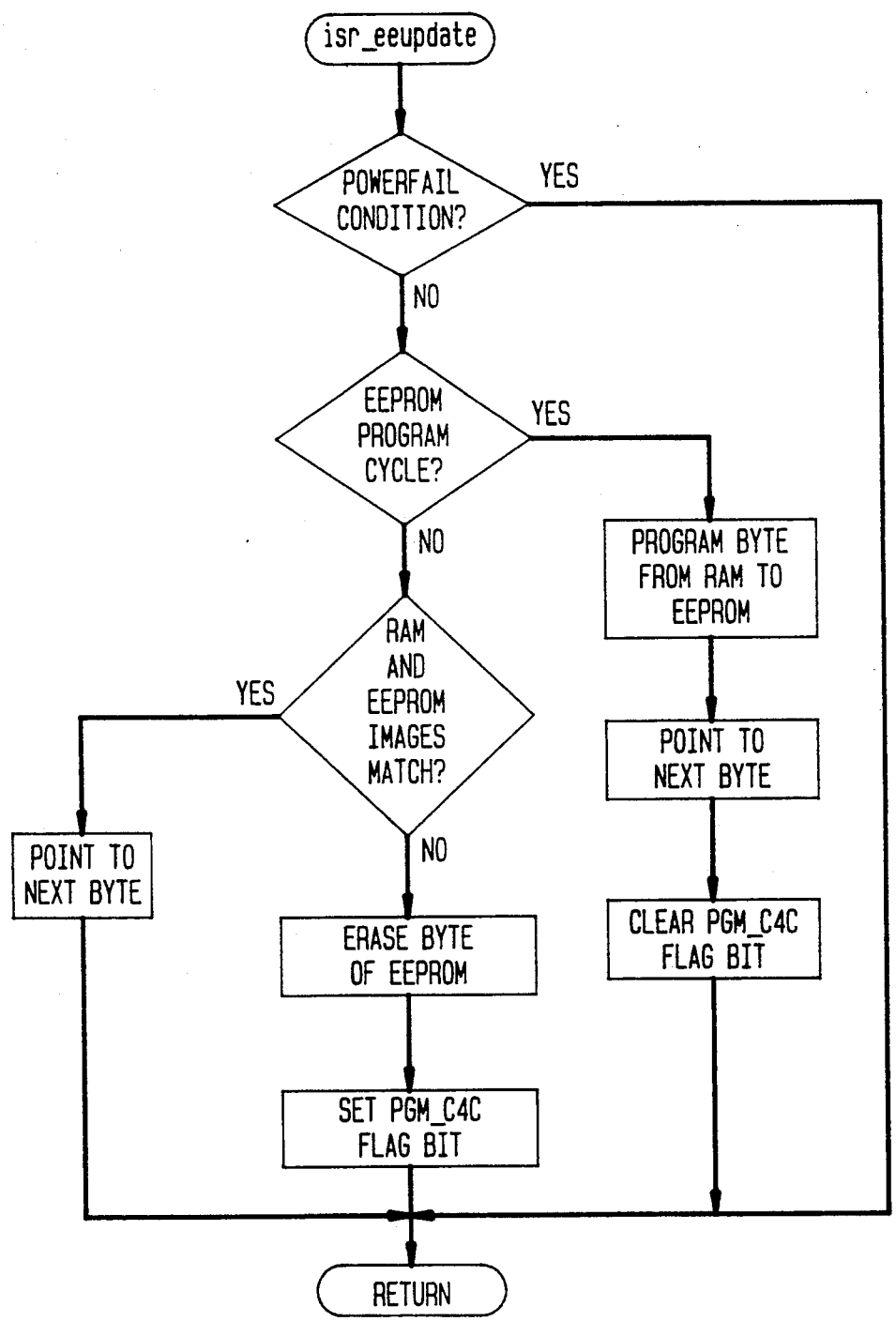

An image of the motor protection setpoints in RAM is stored in EEPROM. All computations made with the setpoints use the values in RAM. All changes are made to the values in RAM. A special interrupt routine isr_eeupdate, shown in the flowchart of FIG. 13, running independently from the other routines, updates the setpoint image in EEPROM. The routine runs every 16 ms as bid by the realtime clock interrupt. Only in the event of a powerfail condition does the routine dismiss itself from performing operations, deferring instead to the isr_eesave routine. Otherwise, isr_eeupdate compares a setpoint value in RAM with its image in EEPROM. If the values are identical, the routine increments pointers to the setpoint to be checked the next time the routine runs. If the values differ, the routine erases the byte in EEPROM and, before exiting, sets the PGM_CYC flag bit. The next time the routine executes, 16 ms later, it checks the PGM_CYC bit and programs the setpoint byte in RAM into EEPROM. The pointers are incremented and the PGM_CYC flag bit cleared before the routine ends. In this way the setpoint image in EEPROM is kept up-to-date.

Figure 14A:
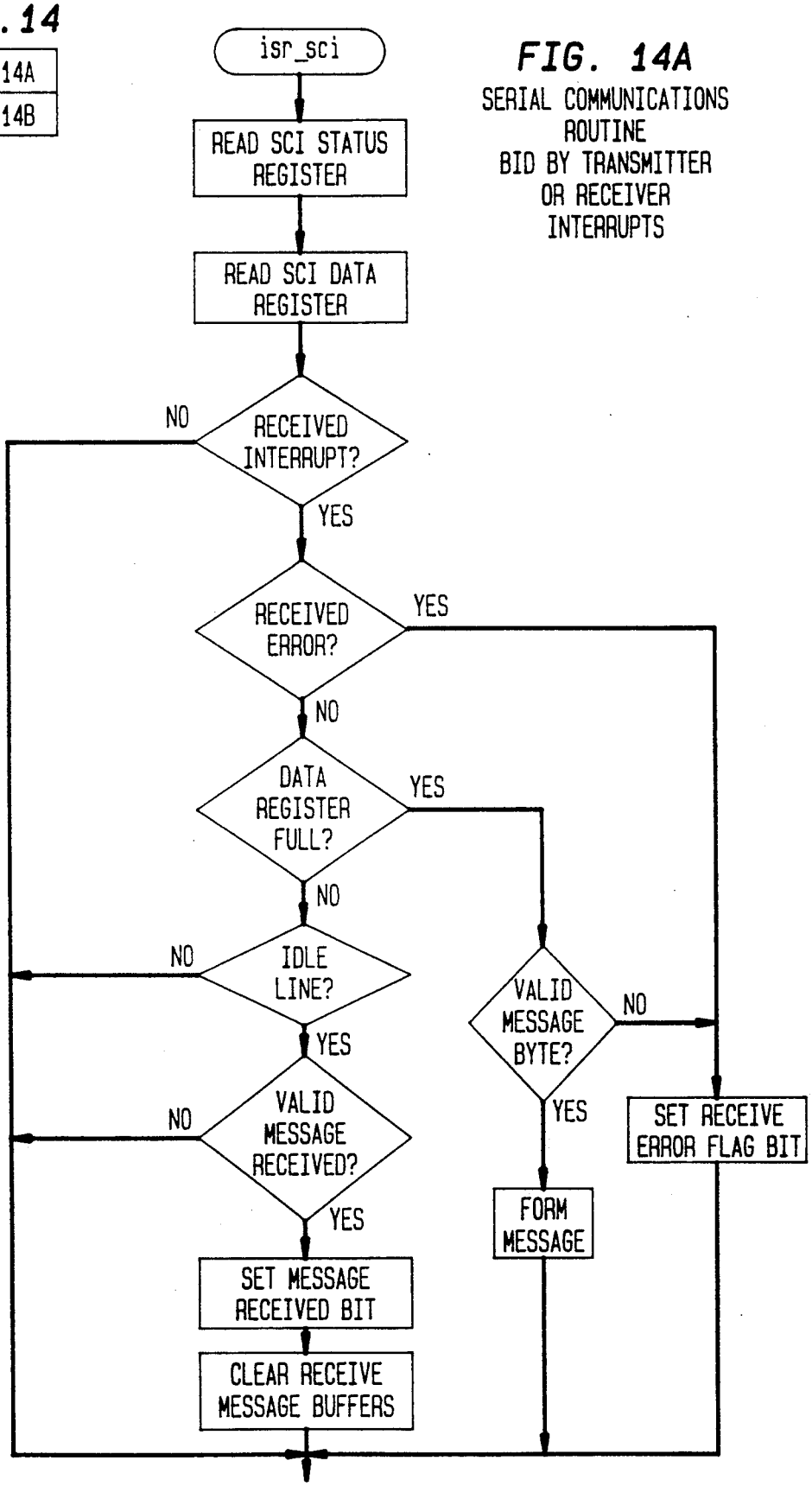
Figure 14B:
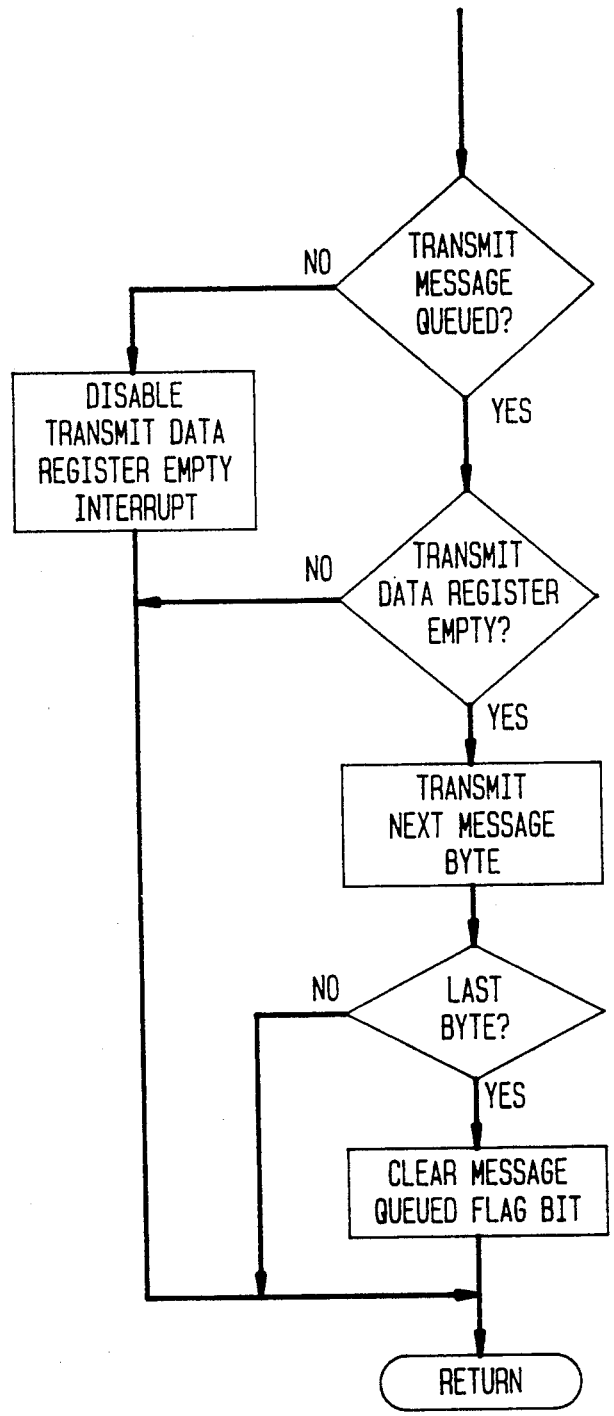

Serial communication between the microcomputer and the external communications device 125 is controlled by the SCI interrupt routine isr_sci. The routine, shown in the flowchart in FIG. 14, handles both incoming and outgoing transmissions. An interrupt is generated, vectoring execution to isr_sci, under the following conditions: transmit data register empty, receive data register full, or receiver line idle. The SCI routine determines which source caused the interrupt and responds accordingly. The routine first reads and saves the status of the SCI status register SCSR, which contains the source of the interrupt, and the contents of the SCI data register SCDR, which contains the most recent byte received.

After saving the status and the data, isr_sci checks to see if the interrupt source is the receiver. Sources of receiver interrupts are receive data register full, indicating a byte has been received, and receiver idle, a logic high on the receive line for at least ten bit times. If a byte has been received, isr_sci processes the byte to see if it forms part of a valid message. If so, the byte is combined with other consecutively received bytes to compose a message. When an idle line causes the interrupt, which occurs at the completion of a received message, the previously received message bytes are processed. If the message is a valid message, a flag bit corresponding to the received message is set, indicating to the message processing task in the background which message to process.

If the source of the interrupt is the transmitter, indicating that the transmit data register is empty and ready for another byte to be transmitted, isr_sci writes the next byte to the transmit data register. In sending out a message, the SCI routine formats the message selected by the message processing task. After determining the byte to be transmitted next, isr_sci writes it to the data register SCDR from which the SCI automatically transmits it. Upon completion of the message transmission, the transmit line goes to the idle state. The SCI baud rate for both transmission and reception is set in the initialization task.

Although shown connected as an across-the-line starter in FIG. 1, the preferred embodiment can be connected and programmed for many starter applications, including across-the-line reversing, two-speed, and reduced-voltage. The only difference from one starter application to another are in the assignment and labeling of local and remote inputs and status indicators, the number and connection of remote contacts, and the program code implementing the Boolean logic equations. Some inputs and status indicators are common to such a majority of applications that their functions are fixed. Table 3 illustrates the input and the output assignments for four different starter applications:

TABLE 3

| DEVICE SYMBOL | APPLICATION A | B | C | D |
|---|---|---|---|---|
| LOCAL INPUT | | | | |
| PB1 | STOP | STOP | OFF | |
| PB2 | START | FWD | LOW | |
| PB3 | | REV | HIGH | |
| PB4 | HAND | | | |
| PB5 | OFF | | | |
| PB6 | AUTO | | | |
| PB7 | TEST/REST | TEST/RESET | TEST/RESET | TEST/RESET |
| REMOTE INPUT | | | | |
| AC1 | START CONTACT | STOP PB | LOW CONTACT | STOP PB |
| AC2 | | FWD PB | HIGH CONTACT | START PB |
| AC3 | | REV PB | | EXT TRIP CONTACT |
| AC4 | | | | RUN SEAL-IN CONTACT |
| COIL DRIVER | | | | |
| OUT1 | START | FWD | LOW | START |
| OUT2 | | REV | HIGH | RUN |
| OUT3 | | | | |
| LED | | | | |
| LED1 | CPU FAULT | CPU FAULT | CPU FAULT | CPU FAULT |
| LED2 | EXT TRIP | EXT TRIP | EXT TRIP | EXT TRIP |
| LED3 | PHASE UNBALANCE | PHASE UNBALANCE | PHASE UNBALANCE | PHASE UNBALANCE |
| LED4 | OVERLOAD TRIP | OVERLOAD TRIP | OVERLOAD TRIP | OVERLOAD TRIP |
| LED5 | INCOMPLETE SEQUENCE | INCOMPLETE SEQUENCE | INCOMPLETE SEQUENCE | INCOMPLETE SEQUENCE |
| LED6 | IMPENDING TRIP | IMPENDING TRIP | INPENDING TRIP | IMPENDING TRIP |
| LED7 | GENERAL FAULT | GENERAL FAULT | GENERAL FAULT | GENERAL FAULT |
| LED8 | AUTO | | | AUTO |
| LED9 | OFF | | | |
| LED10 | HAND | HAND | HAND | |
| LED11 | READY | READY | READY | READY |
| LED12 | | REV | HIGH | |
| LED13 | RUN | FWD | LOW | RUN |
| LED14 | STOPPED | STOPPED | STOPPED | STOPPED |

A. Local 3-wire, remote 2-wire, across-the-line.
B. Local/remote 3-wire, across-the-line reversing.
C. Local 2-wire, two-speed.
D. Remote 3-wire, reduced voltage.
Device references are to FIG. 3.

Two of the inputs and nine of the outputs listed in Table 3 are dedicated to the assigned functions and may not be reassigned. The dedicated inputs are PB1, which is always the STOP or OFF button, and PB7, which is always the TEST/RESET button. The dedicated outputs are the following LEDs:

1. LED1—CPU FAULT (indicates a processor fault)
2. LED2—EXTERNAL TRIP (indicates an external fault signal sent from a remote device over one of the ac inputs)
3. LED3—PHASE UNBALANCE (indicates a load current imbalance of over 40% or, when flashing, of between 20% and 40%)

4. LED4—OVERLOAD TRIP (indicates that the motor was tripped off because of an overload condition)

5. LED5—INCOMPLETE SEQUENCE TRIP (indicates that the motor was tripped off because of an incomplete starting sequence)

6. LED6—IMPENDING TRIP (flashes to indicate that the load current is between 100% and 110% of the overload current setting; stays on to indicate the load current is greater than 110% of the setting)

7. LED7 GENERAL FAULT (indicates redundantly a CPU FAULT, an EXTERNAL TRIP, an OVERLOAD TRIP, or an INCOMPLETE SEQUENCE TRIP)

8. LED11—READY (indicates the presence of control power)

9. LED14—STOPPED (indicates the motor is not energized)

Of the LED outputs, only LED2 (EXTERNAL TRIP) and LED14 (STOPPED) are controlled by the solution of Boolean logic equations. The states of the other dedicated LEDs are determined by various conditions not related to the selected starter application. The state of each of the undedicated output devices (the three coil drivers and LED8-13) and dedicated LEDs LED2 and LED14 is determined by the solution of a Boolean logic equation whose terms are other inputs and outputs. Certain timing functions, such as the two externally settable timers and the transition and incomplete sequence timers for reduced-voltage starters, can be included in the logic equations. The program code implementing the logic equations for the selected application is stored in the microcomputer's EEPROM, tailoring the control to the selected application. The sets of logic equations for the starter assignments of Table 3 are part of an expandable library of logic equations representing many applications.

Although the various motor starter applications have been described herein as being represented by Boolean logic equations, it should be recognized that other representations, such as ladder diagrams, correspond one-for-one. In fact, the Boolean equations in the library are usually derived from the ladder diagrams of the various applications. If an application changes, the corresponding logic equations can be transmitted to the microcomputer from the external communications device 125. No internal wiring changes are required. Of course, any relabeling of input nomenclature or reconnection of remote contactors required by the new application must be done. Each set of logic equations in the library has a unique control circuit number for purposes of identification. The number can be displayed on the set/display device 119 with function F21 in Table 1.

The two externally settable timers may be assigned specific functions for a given application. Two examples are an on-delay for the staggered starting of a series of motors and a delay to prevent switching from forward to reverse, and vice versa, without giving the motor a chance to slow. Because the functions of the timers are programmed as part of the code implementing the logic equations, the functions may change with the application. The timers are set with the set/display device's timer functions, F7 and F8 in Table 1.

Because many of the dedicated functions, such as those associated with the overload relay, can be disabled, the control is adaptable through the logic equations to non-motor applications, such as slide-valves. To handle applications requiring more inputs and outputs than shown in the circuit diagram of FIG. 3, additional output latches and drivers and input buffers, along with the necessary supporting circuitry and interconnection terminals, can be added.

In reduced-voltage starters, a motor is started by connecting the motor terminals through a contactor to a voltage less than the line voltage. As the motor reaches operating speed, another contactor is closed, connecting the motor terminals to full line voltage for running. Typically, the transition from reduced to full voltage is controlled by a timer that starts to time when the start command is given. Because plant electricians set the timer through trial and error, variations in settings are often due more to variations in electricians than to variations in motor characteristics. The availability of a measure of the load current makes possible a smooth, intelligent transition based on the motor's operating status, instead of on guesswork.

The transition from starting to running is best made when the starting current drops to the full-load current value. The logic equations for reduced-voltage starters, in conjunction with code in the A/D conversion routine (isr_ad), perform intelligent reduced-voltage starting. When a start command is given, the logic equation code starts one of the long-term timers, setting it to time out in 150% of the locked-rotor time. (Locked-rotor times for motors of various sizes are stored in a table in ROM.) Meanwhile, the A/D routine, which is continuously computing the load current, disables the timer and sets the timeout flag if the current drops to the full-load current setpoint value, as set, for example, by function F2 (see Table 1) of the set/display device 119. The logic equation code then detects the timeout flag and initiates the transition. If, however, the current does not drop to the full-load current value, the timer times out in the preset time of 150% of the locked-rotor time, at which time the logic equation code will initiate the transition. Once the transition command is given, the logic equation code starts the one-second incomplete sequence timer and, if the seal-in contact closure is not detected before the timer times out, sets the IS flag bit to illuminate the INCOMPLETE SEQUENCE LED and stop the motor. In this way, a smooth transition is achieved.

MOTOR MODEL

The preferred embodiment of the motor model provides for a model which can be digitally simulated and defined in a program which can be executed by the microprocessor of the motor controller. Based only upon time and the digital representations of the rms values of the load currents in the phases of a motor, the digital simulation of the motor performed by the program permits the microprocessor of the motor controller to provide output such that the motor controller can then manipulate the actual motor load current in accordance with the status of the motor.

The purpose of the motor model is to provide a means for estimating the following values:
 the temperature of a motor's windings;
 a change in the temperature of the motor's windings with respect to time;
 the temperature of the motor's housing; and
 a change in the temperature of the motor's housing with respect to time.

These values are based upon the actual motor current and changes in the actual motor current with respect to time. The values are then compared with acceptable ranges for the values so that the microprocessor can initiate an appropriate action if a particular value falls outside of its acceptable range.

Figure 15:
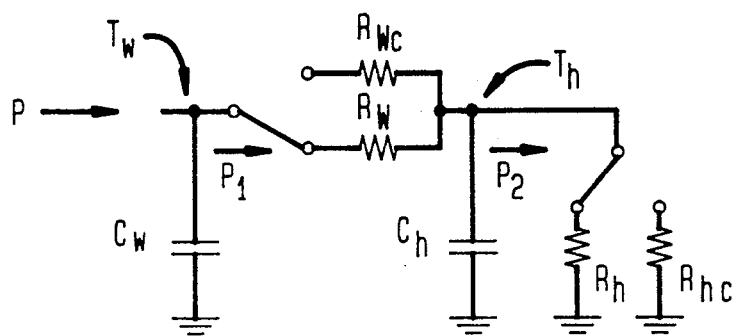
FIG. 15 is a circuit representation of the motor model.

The present preferred embodiment of the motor model is based upon a thermal model analagous to the two-capacitor, four-resistor circuit illustrated in FIG. 15. The values of the two capacitors Cw and Ch are analogous to the thermal capacities of the motor windings and the motor housing; the values of the four resistors Rw, Rwc, Rh and Rhc are analogous to the thermal resistance between the windings and the housing and between the housing and the environment; the voltages Tw and Th across the capacitors are analogous to the winding and housing temperatures; and the current P applied to the circuit is analogous to rate of energy delivered to the motor.

More specifically, Rw is analogous to the winding thermal resistance during a rise in winding temperature, Rh is analagous the housing thermal resistance during a rise in housing temperature, Rwc is analagous to the thermal resistance of the winding during a decline in winding temperature, and Rhc is analagous to the thermal resistance of the housing during a decline in housing temperature. The values of the various elements depend on emperical motor data and motor nameplate data. Unlike the method of protection employed by overload relays, the motor model is general enough to protect many different sizes and classes of motors, while being flexible enough to provide customized protection for each motor.

The input P to the model is a function of the largest of the rms current values calculated for the motor phases. P is related to the largest of the rms current values (I) and the rated full load current of the motor ($I_{flc}$). For Iratios ($I/I_{flc}$) between 0 and 1.1, P is equal to Iratio, for Iratios between 1.1 and 1.6, P is based upon table 1 attached as table 1; and for Iratios above 1.6, P is equal to Iratio$^2$.

By way of example, 80° C. has been recognized as an appropriate and safe operating temperature (Tw) for almost all motor windings having class B insulation and 50° C. has been chosen as a reference operating temperature for motor housings (Th). These temperature are relative to ambient temperature. For these steady state temperatures Tw, Th, it can be seen from the model that Rw is 30° C./W and Rh is 50° C./W.

The transient solution of the motor model circuit for heating involves the solution of the following equations.

$$(T_{w(t)}/T_0) = (T_{w0}/T_0) + ((P/P_0) - (P_1/P_0)) \cdot dt/(C_w/C_0) \quad (1)$$

$$(P_{1(t)}/P_0) = ((T_w/T_0) - (T_h/T_0))/(R_w/R_0) \quad (2)$$

$$(T_{h(t)}/T_0) = (T_{h0}T_0) = ((P_1/P_0) - (P_2/P_0)) \cdot dt/C_h/C_0 \quad (3)$$

$$(P_{2(t)}/P_0) = ((T_h/T_0)/(R_h/R_0) \quad (4)$$

Figure 16:
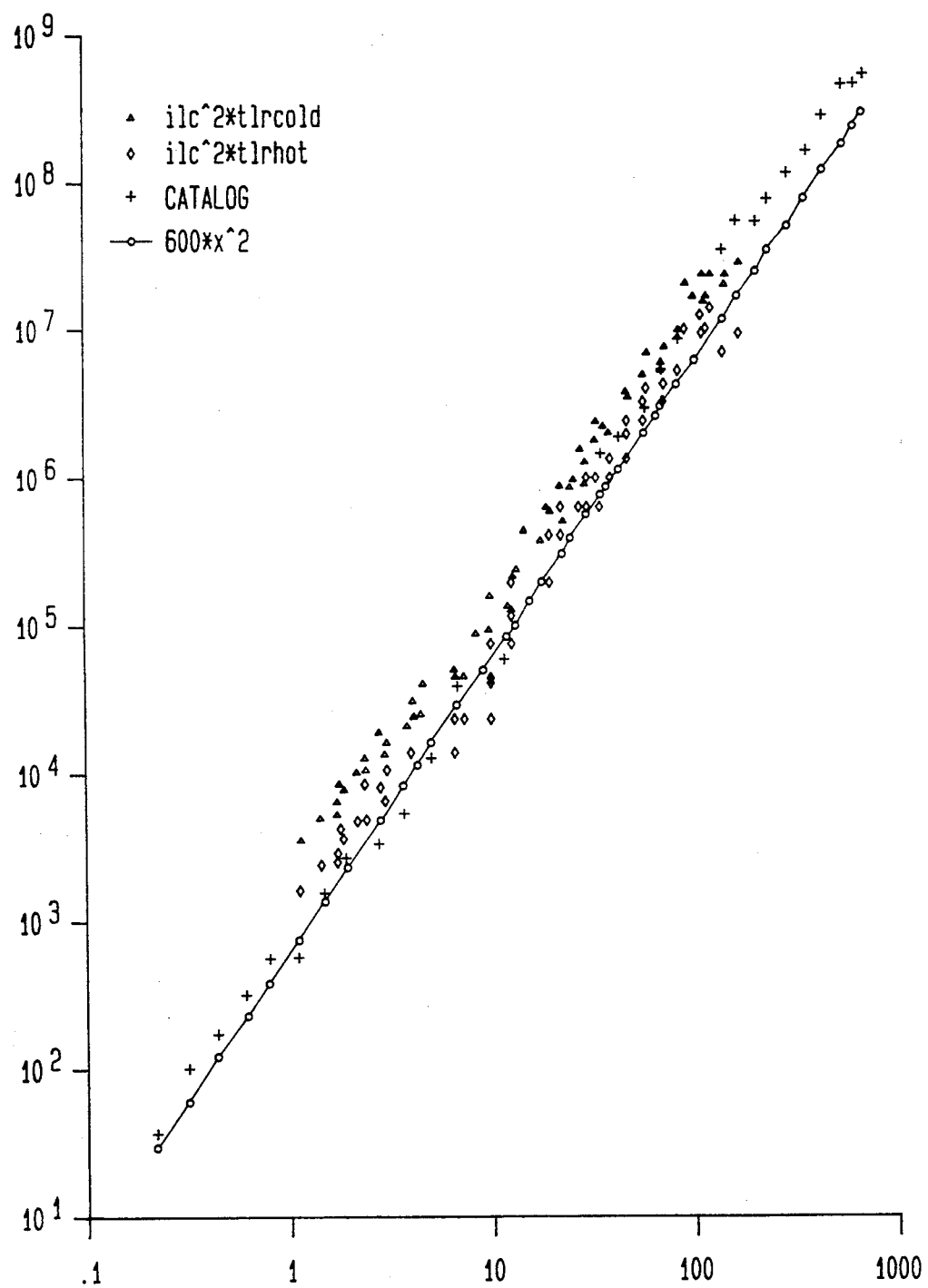

For the presently preferred embodiment of the motor model, the value for Cw was derived from empirical motor data for 2, 4, 6 and 8 pole motors from 0.3 amps to 540 amps. From an analysis of the motor data the relationship illustrated in FIG. 16 was derived. From FIG. 16 it can be seen that the product of the square of the starting current (Ist$^2$) or locked rotor current (Ilr) and the time it takes for a motor winding temperature to rise 140 C. from ambient temperature with its rotor locked (Tlr) are related to the motor full load current Ifl. Class B insulation for motor windings is rated to withstand 185 C. above an ambient temperature of 40 C. The temperature rise of 140 C. was chosen as a basis for the Tlr time since it offers a 25% safety factor with respect to the rated insulation temperature of 185 C.

In the presently preferred embodiment of the motor model, it is assumed that first Ist is 6 times its full load current (Iflc). From FIG. 16, Tlr can be calculated as 25 second. The 25 second Tlr time corresponds to the time it took for the winding temperatures of the motors tested, and presumably similar motors, to rise 140 C. with a locked rotor. ($(9 \times 10^4)/(6 \times 10)^2 = 25$ seconds). For purposes of a safety factor, the 25 second time was reduced by 20% to 20 seconds. Based upon the 20 second time constant and the observation that the starting current for a motor (Ist) is approximately six times the value of the full load current Ifl, the value of Cw is calculated as 5.14 w sec/° C. (Cw = (Iratio)$^2$ × Tlr/temperature rise; for Iratio=6, Tlr=20, and temperature rise=140.)

The value for Ch is derived from FIG. 17. FIG. 17 illustrates the observed time constants for motor housings (tc). As illustrated, the time constants for the motor housings are related to the full load current of the motor. This relationship is approximated by the following function:

$$tc = 7 + 53(1 - e^{-.01Ifl})$$

From this relationship the value of Ch can be obtained by dividing tc by Rh, to obtain the following relationship:

$$Ch = [1/Rh] \cdot [7 + 53(1 - e^{-.01Ifl})]$$

The values of Rhc and Rwc depend on the actual observed time constant of a motor. In the presently preferred embodiment of the motor model, Rhc is estimated as 3 times the value of Rh, and Rwc is estimated as 3 times the value of Rw. These estimates are based upon actual data.

Upon establishing the parameters for the motor model, the motor model can be implemented in the form of a program which is executable by the microprocessor of the motor controller. The implementation of the motor model is described below in reference to FIGS. 18a-18e.

In block 1, normalizing values are initialized and provided. These values are provided so that the equations used for the motor model can be manipulated in a unit-less form. In block 2, the parameters and values used in the motor model are initialized. The time (t) the winding temperature (Tw), the housing temperature (Th), and the values of P$_1$ and P$_2$ (initial values used to solve the model equations) are set to 0.

Twrestart is set at 80T$_0$. Twrestart is compared to the value of the winding temperature (Tw) calculated based on the motor model. When Twmax is exceeded by Tw, the motor controller will not allow the motor to be restarted as long as Tw is greater than Twstart unless an override command is provided.

Thtrip is set at 60 T$_0$. Thtrip is compared to the value of housing temperature (Th) calculated. When Th is greater than Th trip, the motor controller will stop the motor.

The values of Rw, Rh, Cw and Ch are discussed above and are set as shown.

Thflc and Twflc are set at 50 T$_0$ and 80 T$_0$ respectively. These values can be used to adjust the motor full load current (Iflc) from the motor's name plate data.

This adjustment is made since the full load current Iflc on the data plate of a motor may not be the same as the actual Iflc of the motor. To make the adjustment, the program defining the motor model can adjust Iflc such that the temperature of the housing Th equals Thflc and the temperature of the winding Tw equals Twflc when the motor is running at steady state under normal conditions.

Block 3 is a decision block in which the winding temperature (Tw) is compared to Twstart. If Tw is less than Twstart, the warning that the maximum winding temperature (Twmax) has been reached is cleared. If Tw is greater than Twstart the warning remains and prevents the motor from starting.

Block 4 is decision block which functions to redefine the temperature limit of the winding for tripping (Twtrip). If Twtrip, based upon the motor class, is greater than Twmax, Twtrip is set to Twmax to provide greater protection for the motor. If Twtrip, based upon the motor class is less than Twmax, Twtrip is not changed.

After block 5, if the motor is not stopped, the motor current is measured and the current unbalance for the motor is determined if the motor is multi-phase. If the current unbalance is greater than 0.4, P is increased to account for the current unbalance.

In block 6, the ratio (Iratio) of the motor load current (Imax) and the full load current Iflc of the motor is calculated.

Figure 18A:
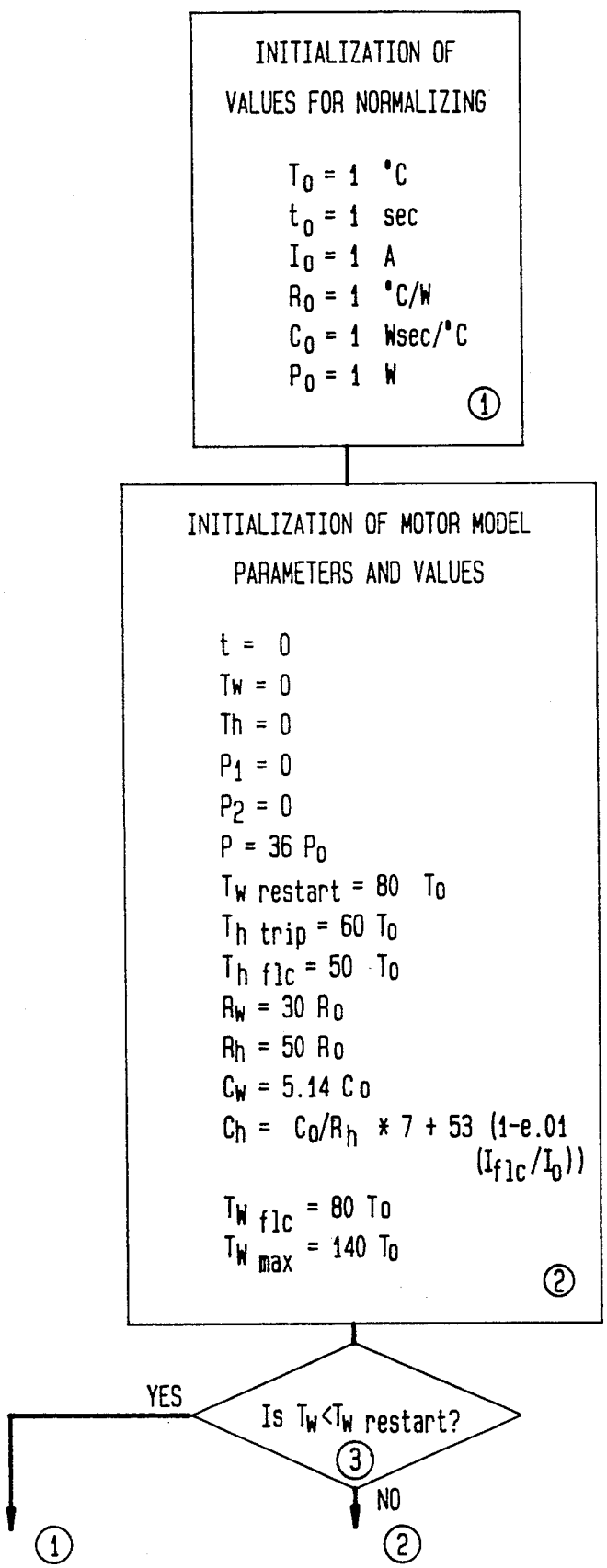
FIGS. 18a–e is a flowchart representing the implementation of the motor model.
Figure 18B:
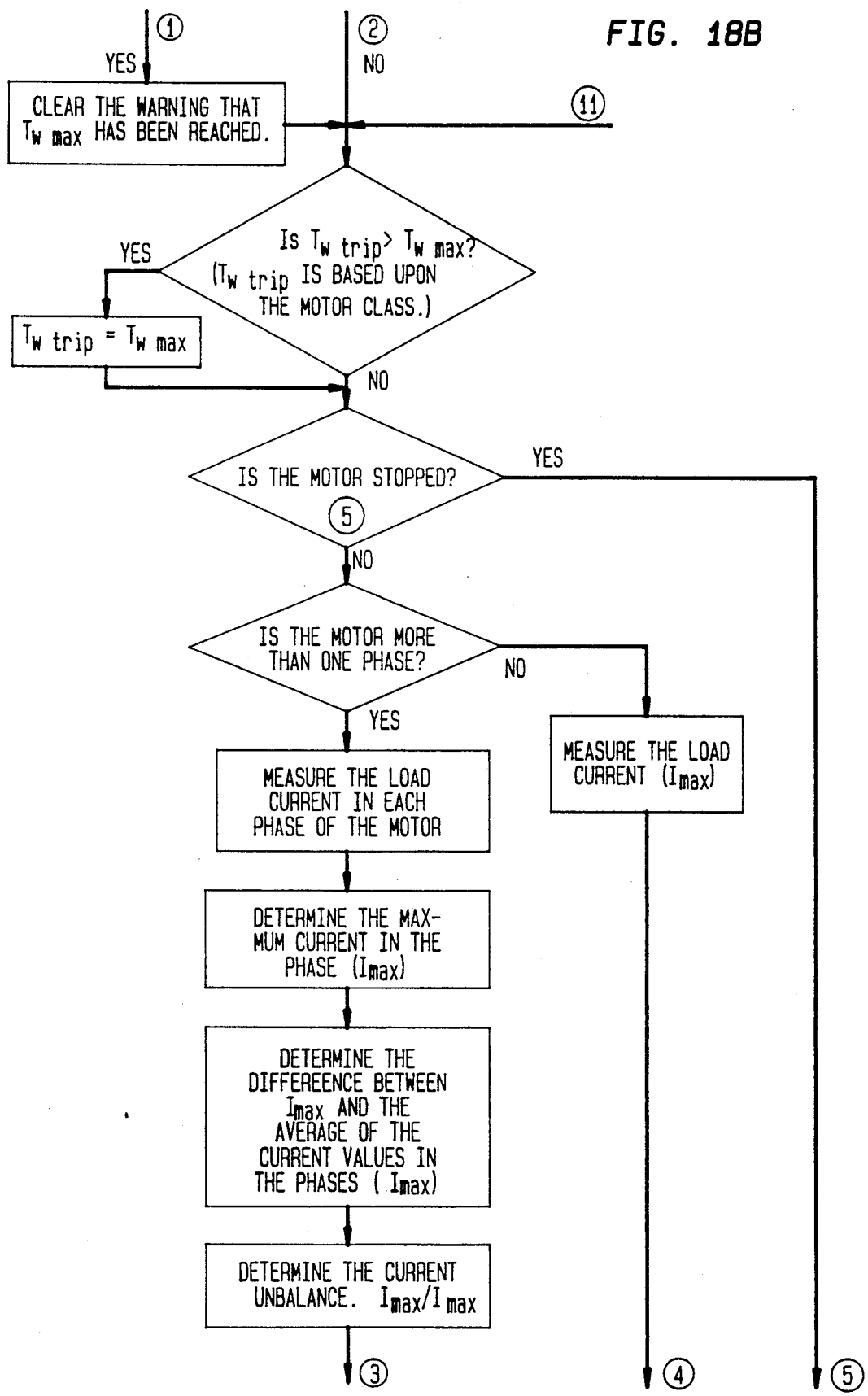
Figure 18C:
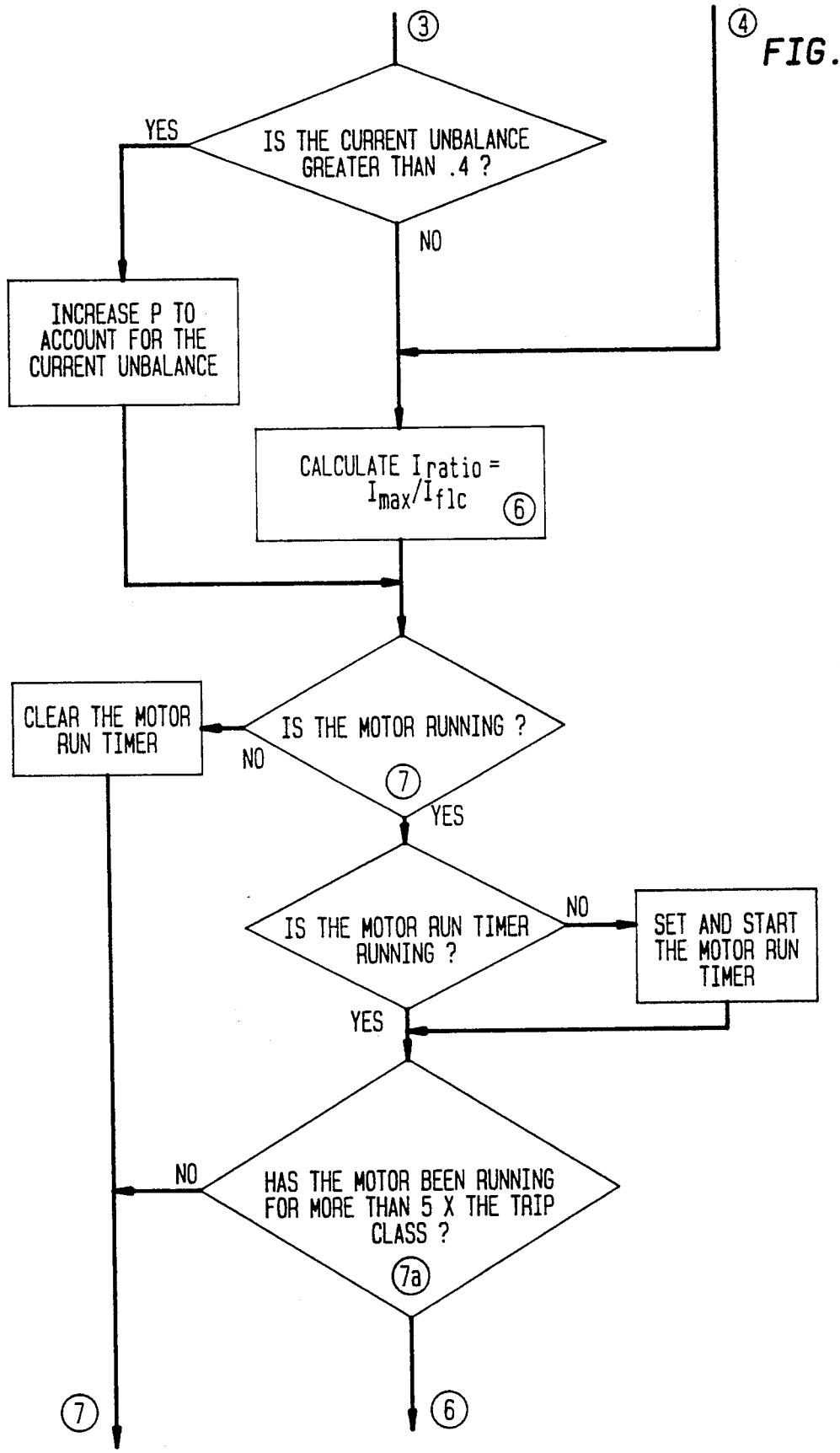
Figure 18D:
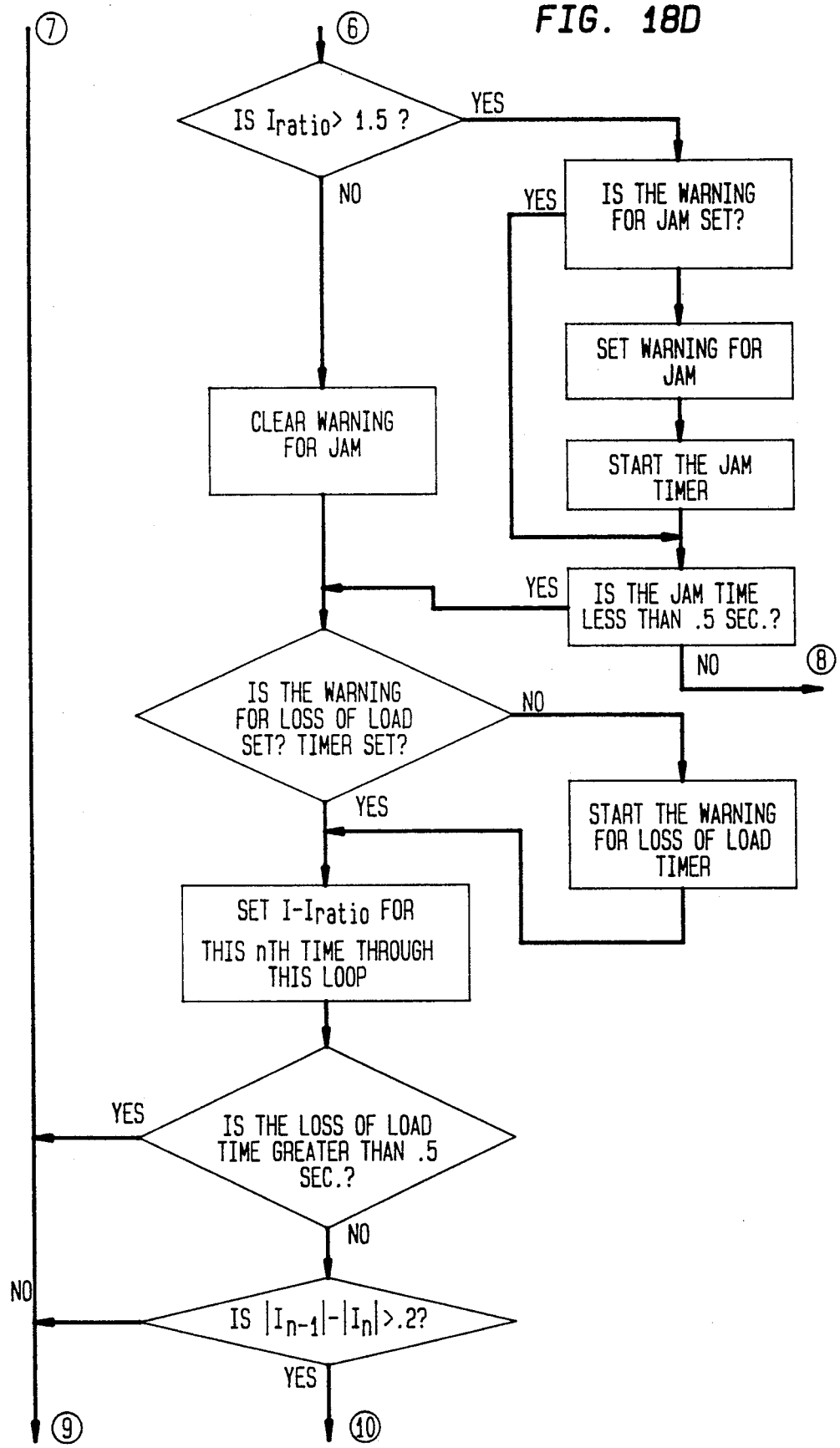
Figure 18E:
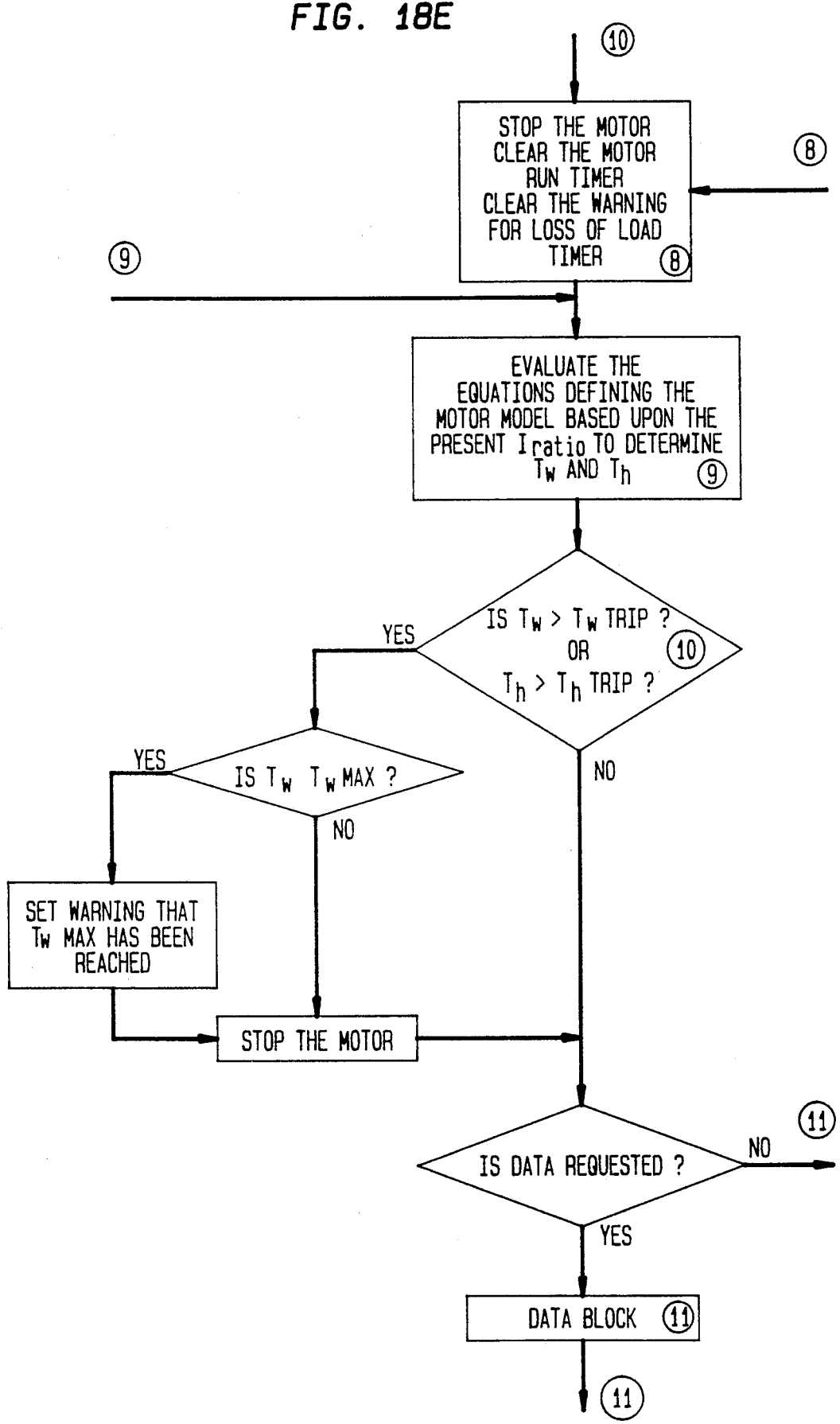

In block 7 the status of the motor is again checked to determine whether or not the motor is running. Subsequently, if the motor is running a motor run timer is set and started if the timer is not already running. In block 7a the running time for the motor is checked, and if the running time is less than 5 times the trip class of the motor, the jam protection and loss of load protection logic of FIG. 18d is bypassed. If the running time is greater than 5 times the trip class, the jam protection and loss of load protection loops are entered.

Jam protection occurs when Iratio is above 1.5 and less than 10. The jam protection operates so that when the motor has been operating at Iratio 1.5 for more than 0.5 seconds, the motor stops. The loss of load protection is set up so that the motor is stopped if the change for Iratio is more than 0.2 for a 0.5 second time period. If there is not a loss of load or jam, block 10 is passed over. For Iratio greater than 10 motor protection is provided by the motor line circuit breaker.

Block 9 is the basis of the motor model, since it is at this stage that the equations defining the motor model are solved to determine Tw and Th. In block 10, Tw and Th are compared to the limits for the winding temperature and the housing temperature (Twtrip and Thtrip). If either of the limits are exceeded the motor is stopped.

Block 11, the data block, can be set up so that when the motor controller is accessed with a display device, data such as the following can be displayed:
average motor current;
motor current at tripping;
time before the motor can be restarted;
total elapsed motor running time;
total number of motor starts; and
total number of overload trips.

From block 11, the monitoring process is restarted back to block 4.

Figure 19:
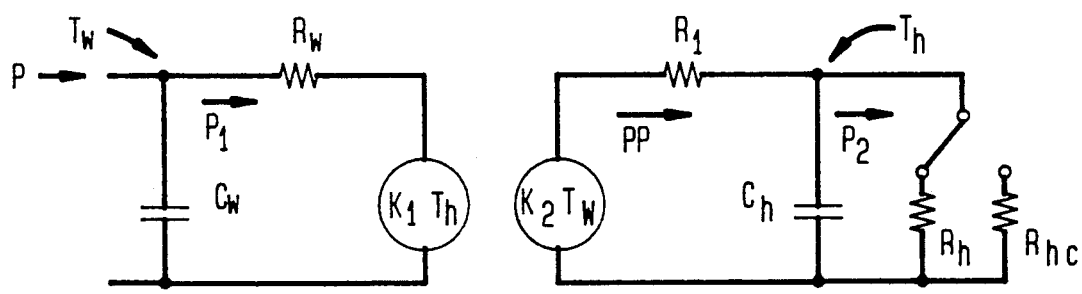

Another embodiment of the motor model is based upon a thermal model analogous to the two-capacitor, four resistor electric circuit illustrated in FIG. 19. For this model, the values used for Tw, Th, Cw, Ch, Rw, Rwc, Rh and Rhc are the same as in the model of the preferred embodiment. The difference in the models is found in the calculation of P and equations used to solve the model.

In this embodiment of the model, for Iratio between 0 and 1.05 P equals Iratio and for Iratio greater than 1.05 P equals (Iratio)$^2$. To solve the model the following equations are used in block 10 to determine Tw and Th.

$$\frac{Tw(t)}{To} = (Two/To) + \frac{((P/Po) - (P1/Po))}{(Cw/Co)} * dt$$

$$\frac{P1(1)}{Po} = \frac{((Tw/To) - (k1\ Th/To))}{(Rw/Ro)}$$

$$\frac{PP(t)}{Po} = \frac{((k2\ Tw/to) - (TH/To))}{(Rw/Ro)}$$

$$\frac{TH(t)}{To} = (THo/To) + \frac{((PP/To) - (P2/To))}{(CH/To)} * dt$$

$$\frac{P2(1)}{To} = \frac{(TH/To)}{(RH/Ro)}$$

The constants k1 and k2 are calculated such that the motor model can be adjusted to more accurately model a given motor.

While one embodiment of a motor controller and several modifications thereof have been shown and described in detail herein, various other changes and modifications may be made without departing from the scope of the present invention

We claim:

1. An apparatus for starting and controlling an electric motor which is coupled with a power supply through contactors which when closed connect the motor to the power supply through respective conductors and when open disconnect the motor from the power supply, said apparatus being able to store at any one time program information for starting and controlling only a subset of a set of different electric motors but being electrically reprogrammable to store therein program information for any selected subset of said set, said apparatus comprising:
    (a) sensors coupled with the conductors to generate sensor outputs related to the state of selected parameters of at least one of said motor and said conductors;
    (b) a display for displaying the state of selected parameters of the motor and of said apparatus;
    (c) a microprocessor circuit having:
        (1) an electrically erasable and programmable read-only memory for storing program information for both starting and controlling an electric motor;
        (2) pins coupled with said sensors to receive sensor outputs therefrom; and
        (3) pins coupled with said contactors to command the contactors to open or close and coupled with said display to control the state of the display;
    (d) a source of program information coupled to said microprocessor for electrically programming or reprogramming said electrically erasable and programmable read-only memory to store therein program information for starting and for controlling a selected motor, said program information comprising:
  (1) starting programs defining parameters of the delivery of electric power to the motor when starting the motor; and
  (2) control programs defining relationships between said sensor outputs on the one hand and, on the other hand, the state of the display and the open and closed states of the contractors; and
(e) said source of program information being selectively energized to electrically program or re-program said memory in the microprocessor circuit to store therein a selected program information matching a selected motor, and said microprocessor circuit thereby being enabled to start and control said selected motor and to control said display when coupled with said selected motor.

2. An apparatus as in claim 1 in which said microprocessor circuit is in the form of a single-chip microprocessor having an on-chip electrically erasable and programmable read-only memory.

3. An apparatus as in claim 1 including a plurality of local input devices comprising manually operable switches coupled with said microprocessor circuit to deliver thereto commands for initiating motor operations, wherein the program information stored in said memory assigns types of commands to said switches so that a given one of said switches may command one type of motor operation under program information for one selected motor but may command a different type of motor operation under program information for another selected motor without rewiring said switches and their coupling to the microprocessor circuit.

4. An apparatus as in claim 1 including a plurality of input devices comprising remote switches coupled with said microprocessor circuit to deliver thereto commands for initiating motor operations, wherein the program information stored in said memory assigns types of commands to said switches so that a given one of said switches may command one type of motor operation under program information for one selected motor but may command a different type of motor operation under program information for another selected motor without rewiring said remote switches and their connection to the microprocessor circuit.

5. An apparatus as in claim 1 including a plurality of indicator lights coupled with said microprocessor circuit to receive therefrom commands for selective energization indicative of selected motor functions, wherein the program information stored in said memory assigns indicator lights to motor functions so that a given one of said indicator lights may be energized for one type of motor function under program information for one selected motor but may be energized for a different type of motor function under program information for another selected motor without rewiring said indicator lights and their connection to the microprocessor circuit.

6. An apparatus as in claim 1 including a display device having character display positions for displaying values of selected parameters, said display device being coupled with said microprocessor circuit to receive therefrom commands to display at the same character positions the values of different parameters at different times.

7. An apparatus as in claim 1, including a temporary power supply coupled with said microprocessor circuit to remain charged during operation thereof and to detect power failure and in response to store current values of selected parameters in said electrically programmable read-only memory.

8. An apparatus for starting and controlling an electric motor which is coupled with a power supply through contactors which when closed connect the motor to the power supply through respective conductors and when open disconnect the motor from the power supply, said apparatus being able to store program information for starting and controlling different electric motors comprising:
  (a) sensors coupled with the conductors to generate sensor outputs related to the state of selected parameters to at least one of said motor and said conductors;
  (b) a microprocessor circuit for storing program information for both starting and controlling an electric motor, said microprocessor circuit being coupled with said sensors to receive sensor outputs therefrom and with said contactors to command the contactors to open or close;
  (c) input devices coupled with microprocessor circuit to deliver thereto commands for initiating motor operations, wherein the program information stored in said microprocessor circuit assigns types of commands to said input devices so that a given one of said input devices may command one type of motor operation under program information for one selected motor but may command a different type of motor operation under program information for another selected motor without rewiring said input devices and their coupling to the microprocessor circuit.

9. An apparatus as in claim 8 including output devices coupled with said microprocessor circuit to receive therefrom commands for selective energization of said output devices, wherein the program information stored in said microprocessor circuit assigns types of commands to said output devices to that a given one of said output devices may receive one type of command under program information for one selected motor but may receive a different type of command under program information for another selected motor without rewiring said output devices and their coupling to the microprocessor circuit.

* * * * *